United States Patent
Takashina et al.

[11] Patent Number: 6,138,378
[45] Date of Patent: Oct. 31, 2000

[54] WET GAS PROCESSING METHOD AND THE APPARATUS USING THE SAME

[75] Inventors: Toru Takashina; Naoyuki Kamiyama, both of Hiroshima; Takeo Shinoda; Hiromitsu Nagayasu, both of Tokyo; Susumu Okino; Masakazu Onizuka, both of Hiroshima; Koichiro Iwashita; Satoshi Nakamura, both of Tokyo; Kenji Inoue, Hiroshima, all of Japan

[73] Assignee: Mitsubishi Heavy Industries, Ltd., Tokyo, Japan

[21] Appl. No.: 09/341,433

[22] PCT Filed: Nov. 10, 1998

[86] PCT No.: PCT/JP98/05062

§ 371 Date: Sep. 8, 1999

§ 102(e) Date: Sep. 8, 1999

[87] PCT Pub. No.: WO99/24148

PCT Pub. Date: May 20, 1999

[30] Foreign Application Priority Data

| Nov. 11, 1997 | [JP] | Japan | 9-325202 |
| Feb. 13, 1998 | [JP] | Japan | 10-048655 |
| Aug. 18, 1998 | [JP] | Japan | 10-232060 |
| Aug. 18, 1998 | [JP] | Japan | 10-232061 |
| Aug. 18, 1998 | [JP] | Japan | 10-232062 |
| Sep. 18, 1998 | [JP] | Japan | 10-264332 |

[51] Int. Cl.[7] ..................................................... F26B 7/00
[52] U.S. Cl. ............................. 34/379; 34/131; 422/168; 422/172; 423/242; 423/243.03
[58] Field of Search ............................. 34/379, 393, 418, 34/505, 131, 132, 169; 95/174, 181; 422/168, 171, 172; 423/242, 243.03, 243.08, 244.08

[56] References Cited

U.S. PATENT DOCUMENTS

| 3,656,275 | 4/1972 | Hunter | 55/174 X |
| 4,460,552 | 7/1984 | Zakrzewski | 423/242 |
| 4,506,453 | 3/1985 | Shirley, Jr. et al. | 34/131 X |
| 4,585,633 | 4/1986 | Van Camp et al. | 423/242 |
| 4,696,805 | 9/1987 | Shinoda et al. | 423/242 |
| 5,192,518 | 3/1993 | Ikawa et al. | 423/244.08 |
| 5,648,048 | 7/1997 | Kuroda et al. | 422/168 |
| 5,686,053 | 11/1997 | Kikkawa et al. | 422/168 X |
| 5,770,166 | 6/1998 | Shimizu et al. | 422/172 |
| 5,946,818 | 9/1999 | Baxter et al. | 34/379 |

*Primary Examiner*—Stephen Gravini
*Attorney, Agent, or Firm*—Evenson, McKeown, Edwards & Lenahan, P.L.L.C.

[57] ABSTRACT

This invention is related to a wet gas process which would not require a spray pump, and which would allow the absorption liquid to be recovered smoothly even if the flow velocity of the gases entrained to the liquid should decrease. A wet gas processing apparatus in which the absorption liquid collected in the first liquid storage tank is sprayed in a specified direction (which may be upward, horizontal or downward) by a discharge unit consisting of spray nozzles (14) or the like in the absorption tower. The sprayed liquid is brought into contact with the exhaust gases which are conducted into the tower, and the targeted components of the gases are absorbed and removed. This processing apparatus is distinguished by the following. The first liquid storage tank for the absorption liquid comprises a pressure tank (11) which generates a pressurized gas in the space above the surface of the collected liquid (11a). The increased pressure of the pressurized gas is employed to spray the liquid collected in the pressurized tank from the spray nozzle unit in the absorption tower. This apparatus is further distinguished as the following. This invention has overflow ports which generate a virtually horizontal overflow or source flow. The absorption liquid propelled by the overflow ports makes orthogonal contact with the flow of exhaust gases, which results in both atomization of the liquid and liquid-vapor contact.

26 Claims, 21 Drawing Sheets

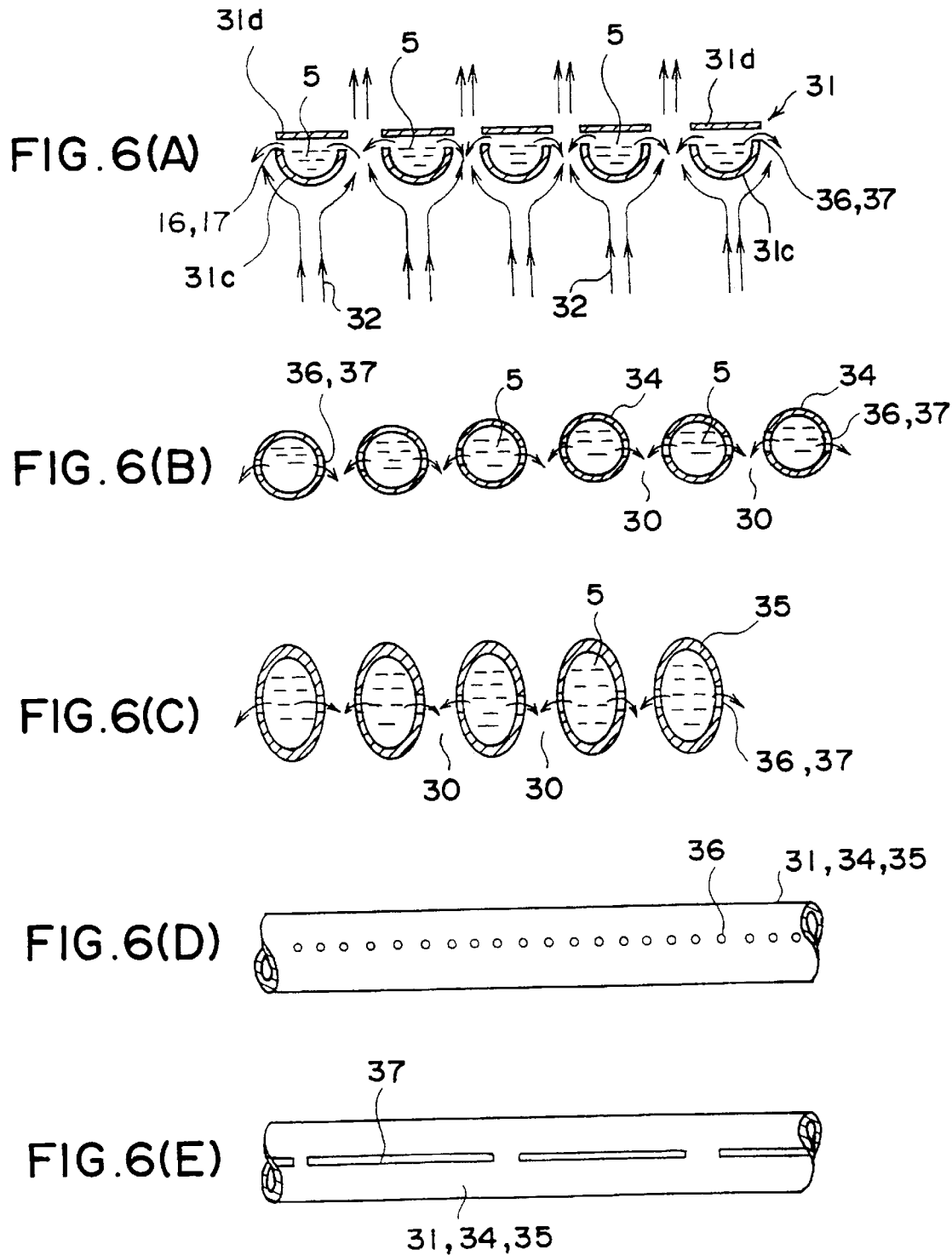

T₁ = START-UP TIME OF THE ABSORPTION TOWER
T₂ = SHUT-DOWN TIME

WET GAS PROCESSING METHOD AND THE APPARATUS USING THE SAME

TECHNICAL FIELD

This invention concerns a wet gas processing method and apparatus to remove from exhaust gas certain targeted components such as those which are harmful. More specifically, it concerns a apparatus which brings about effective liquid-vapor contact between the absorption liquid and the exhaust gas resulting from combusting coal or heavy oil.

TECHNICAL BACKGROUND

Heretofore, various types of liquid-gas contact apparatuses have been employed to remove sulfur dioxide from exhaust smoke using a wet-gas method. These would typically be used to remove harmful substances like sulfur dioxide from the exhaust smoke of a coal-burning boiler. One such apparatus, a previous design by the present petitioners which employs a liquid-column method, is described in Japanese Utility Patent Publication (Koukai) 59-53828.

This apparatus has a number of spray nozzles arranged in an absorption tower. An absorption liquid such as lime slurry is sprayed upward from these spray nozzles to form an absorption column. When exhaust smoke is forced into the center of this flow, the sulfur dioxide in the smoke is absorbed and particulate like fly ash are effectively removed.

A basic design for such a tower is shown in FIG. 24 (A). In the upper portion of absorption tower 2 is exhaust path 8; in its lower portion is smoke inlet 3, the entry port for exhaust gases 1. A number of rows of head pipes 190 are arranged in the lower portion of absorption tower 2. On the pipes 190 are numerous upward-facing spray nozzles, which may, for example, be arranged in a matrix, as shown in FIG. 24(B).

The bottom of absorption tower 2 is made into a funnel shape to form liquid recovery vessel 56. Here the lime slurry or other absorption liquid 5 is collected, after which it is routed to liquid storage tank 57 by pump 21a. This collected absorption liquid 5 is again circulated through spray pump 21b, volume control valve 60 and head pipes 190 back to spray nozzles 4.

The spray nozzle array consisting of all the upward-facing spray nozzles 4 arranged in the matrix forces absorption liquid 5 upward and causes it to assume the form of liquid column jets 5a. At the same time, exhaust gases 1 are brought in via the smoke inlet 3 and forced upward. The flow carries these gases along with the jets of absorption liquid 5 to the top of the tower, where they must pass through jets 5a, now distributed in an umbrella shape. In this way the liquid and vapor are brought into contact with each other.

Subsequently, mist eliminator 6, located in the top of absorption tower 2 around the highest point reached by the jets, separates the absorption liquid 5 which has accompanied exhaust gases 1 and recycles it into liquid storage tank 57. The liquid 5 which falls directly into recovery vessel 56 is transported by recirculation pump 21a into liquid storage tank 57.

With a liquid-vapor contact apparatus of this configuration, when pump 21b is operated, absorption liquid 5 travels through volume control valve 60 and head pipes 190 and is sprayed upward through spray nozzles 4. The exhaust gases 1 which are introduced through entry port 3 are forced to pass through jets 5a to effect liquid-vapor contact. The processed (scrubbed) exhaust gas 7, from which the sulfur dioxide and other noxious components have been removed, is expelled via exhaust path 8.

When this technique is used, by which absorption liquid 5 is sprayed upward, the vapor and liquid are in contact for the entire time that liquid 5 travels up and down the tower. In addition, when liquid 5 reaches the top and spreads into an umbrella shape for its descent, it assumes the form of droplets. This enhances the effect of liquid-vapor contact. When the exhaust gases contain only minimal sulfur dioxide, greater operating economy can be achieved by changing the height of the column of liquid. This method offers a number of benefits over what is known as the packing method, in which the liquid flows into a tower packed with a grid and is there brought into contact with the gases. One such benefit is that with the jet-spray method, the channel for the liquid is unlikely to become saturated.

Also, when the jet-spray method is used, operating spray pump 21b will cause the absorption liquid 5 collected in recovery vessel 56 or tank 57 to be recirculated to head pipes 190, and the pressure of the spray can be adjusted so that the liquid 5 attains a specified height from spray nozzles 4.

For the sake of simplicity, spray pump 21b in the drawing is represented as a single entity. However, in a real situation a number of pumps would be used, posing a problem in terms of compactness as well as cost of equipment and operation.

Furthermore, in order to improve the efficiency of liquid-vapor contact between the exhaust gases and the absorption liquid, a large number of spray nozzles are needed to break the water into minute particles. This is the purpose of the array shown in FIG. 24(B), in which many spray nozzles are arranged in the form of a matrix. We see, then, that this design is costly in terms of the equipment it requires.

It was to address this problem that the designs disclosed in German patent DE-A-1769945 and Japanese patent publication (Kohyo) 9-507792 were proposed. In these apparatuses, a liquid storage tank is provided for the slurry supplied and recirculated to the spray nozzles. The level of the liquid inside the tank is kept higher than the level of the spray nozzles. The absorption liquid sprayed from the spray nozzles is made to accompany the gases to the top of the absorption tower, where the liquid and gases are separated. The separated liquid is kept in the tank, and the gravity differential between the surface of the liquid in the tank and the spray nozzles is used to spray the slurry from the spray nozzles. Without the use of a spray pump, then, employing only the gravity differential, the slurry can be sprayed from the spray nozzles and recirculated.

However, with these prior art designs, the surface of the liquid in the liquid storage tank must be higher than the level from which the spray nozzles spray the liquid inside the absorption tower. Generally, the absorption tower is relatively high, so the tank must be placed even higher in order to have the surface of the liquid above the height of the spray nozzles.

Also, with gas cleaners such a desulfurization apparatus, it is normal for the load on the boiler or other source of the gases to vary. In both these apparatuses, when the gas flow decreases, the drop in the flow velocity will result in less fluid being entrained. This makes it impossible to achieve smooth and consistent contact between the liquid and the gas flow. The sulfur dioxide and particulate will not be effectively removed from the smoke, and the absorption liquid will not reach the top of the tower. This will make it very difficult to return the absorption liquid to its tank, and the level in the tank will gradually decrease until finally it may happen that the liquid can no longer circulate under the force of its own weight.

With both these apparatuses, the velocity at which the liquid is sprayed, or to put it another way the height to which it is sprayed, is directly proportional to the velocity of flow of the exhaust gases. In FIG. 13, the vertical axis represents the exhaust gas velocity, and the horizontal axis represents the operation time. As can be seen in FIG. 13, when the combustion capacity of a combustor is small, as from time $T_1$, the start-up time of the absorption tower, to time $T_2$, its shut-down time, the flow velocity of the exhaust gases will decrease in that time, and it will prove impossible to raise the liquid sprayed from the spray nozzles above a standard level. The horizontal broken line in FIG. 13 represents the minimum loading velocity. As a result, the entire volume of the spray does not reach the mist eliminator in the top of the tower. Instead it falls into the recovery vessel and accumulates there excessively.

Thus it was that in order to achieve continuous recirculation of the absorption liquid in such prior art apparatuses, recovery vessel 56 had to be of a substantial size, and recirculation pump 21*a*, which would be used only during start-up and shut-down of absorption tower 2, had to be a large-capacity pump. These requirements were linked to a needless increase in the cost of the equipment.

In both of these apparatuses, the mist (i.e., water droplets) which entrains with the exhaust gases and so absorbs the target components such as sulfur dioxide strikes the folded panel of the mist eliminator in the top of the tower and then drips down. In this way the absorption liquid is continuously recycled. In prior art apparatuses such as those we have been discussing, the flow velocity of the gases in the tower is normally around 4 to 5 m/s, a speed which allows the mist eliminator to capture the water. Recently, however, there has come to be a growing demand for a flow velocity of over 5.5 m/s, which would improve the processing capacity and reduce the space requirement.

At a velocity over 5.5 m/s, not all the water droplets which reached the top of the tower would be captured by the mist eliminator. The droplets which were still free would be exhausted to the exterior along with their entrained gases. This would be undesirable regardless of whether the gases were being released into the atmosphere or sent to a final stage processing apparatus.

Further, at a velocity over 5.5 m/s, the volume of absorption liquid entrained to the gases which reaches the mist eliminator greatly increases. The liquid which should drip down from the mist eliminator instead forms a vortex at its inlet and remains there (i.e., a zone is created in which the scattered absorption liquid collects). This severely compromises the mist elimination function. As less mist is captured, the water droplets in the collection zone entrain with the exhaust gases and disperse once again. The volume of mist escaping through the smoke flue increases.

DISCLOSURE OF THE INVENTION

In light of the shortcomings of the prior technology, our objective in designing this invention is to provide a wet gas process which would not require a spray pump, and which would allow the absorption liquid to be recovered smoothly even if the flow velocity of the gases entrained to the liquid should decrease.

Another objective of this invention is to provide a wet gas process which would not use the upward-facing spray nozzles required in the prior art, which would employ an energy-efficient method that would not require a great deal of effort, which would eliminate the increasing expense of a large number of spray nozzles, which could be produced at a low cost, and which would enable efficient liquid-vapor contact.

Yet another objective of this invention is to provide a wet gas method for processing exhaust gases which would not require an excessively large liquid recovery vessel or pump capacity, and which would effectively eliminate the problems associated with a decrease in the flow velocity of the exhaust gases.

A further objective of this invention is to provide a method for processing exhaust gases which would allow the height of the column of absorption liquid to be maintained at or above a standard level when the flow velocity of the exhaust gases introduced into the tower decreases because of the lower capacity combustion which occurs during the time the absorption tower is being started up or shut down.

Another objective of this invention is to provide a wet gas method for processing exhaust gases such that the volume of mist (water droplets) entrained to scrubbed gases and exhausted from the tower would be minimized even when the speed of the exhaust gases within the tower (and therefore the entraining rate) increased substantially.

In order to address these issues, we designed the invention disclosed in claim 1, comprising a wet gas processing apparatus in which the absorption liquid collected in the first liquid storage tank is sprayed in a specified direction (which may be upward, horizontally or downward) by a discharge unit consisting of spray nozzles or the like in the absorption tower. The sprayed liquid is brought into contact with the exhaust gases which are conducted into the tower, and the targeted components of the gases are absorbed and removed.

This processing apparatus is distinguished by the following. The first liquid storage tank for the absorption liquid comprises a pressure tank which generates a pressurized gas in the space above the surface of the collected liquid. The increased pressure of the pressurized gas is employed to spray the liquid collected in the pressurized tank from the spray nozzle unit in the absorption tower.

With this invention, then, the volume of liquid sprayed through the spray nozzles is determined by the surface area of the tank which is under pressure and by the pressure of the gas. Thus when the flow velocity of the gases in the tower varies because of fluctuation of the load on the boiler or other combustion engine, the pressure inside the tank can be controlled in whatever direction compensates for this variation. In this way the height of the spray from the spray nozzles can be kept virtually constant, and the absorption liquid can be recovered smoothly even if the flow velocity of the gases entrained to the liquid should decrease.

The pressure of the gas within the tank is maintained at a specified value by balancing the volume of liquid discharged from the tank, the volume of liquid supplied to the tank and the volume of gas blown into the tank.

With this invention, the absorption liquid is not transported using the direct pressure of a spray pump. Rather, the interior of the tank is pressurized using a pressurized gas such as compressed air. So instead of using a number of pumps, this invention requires only a pressurized tank and a source of pressurized gas, such as an air compressor, to supply the gas to the tank. The set-up can be made smaller and the cost of the equipment and operation can be reduced.

Even in equipment in which the spray nozzles supplying the absorption liquid face upward, the upward-facing spray nozzles need not be placed above the surface of the liquid in the pressure tank. The fact that the tank can be positioned lower increases the freedom of design.

As is disclosed in claim 2 of this application, with this invention, if one of the components targeted for absorption in the liquid and removal is sulfur dioxide ($SO_2$), the pressurized gas should be one which contains oxygen, and the gas should be blown into the collected liquid at the bottom of the tank.

The slurry of absorption liquid which is sprayed through the spray nozzles contains limestone which has absorbed $SO_2$ when it came in contact with the exhaust gases. When this slurry is collected in the pressure tank, contact with the gas containing oxygen will oxidize the $SO_2$ and generate calcium sulfate dehydrate (gypsum).

The invention disclosed in claim 3 of this application is a wet gas processing apparatus with upward-facing spray nozzles which spray the absorption liquid upward from a spray nozzle in the absorption tower.

The first liquid storage tank for the liquid should be a pressure tank which generates a pressurized gas in the space above the surface of the liquid. The collection unit to collect the liquid which has absorbed the targeted components should be placed higher in the absorption tower than the surface of the liquid in the pressure tank. The outlet of the pipe through which the absorption liquid is transported from the recovery vessel to the pressure tank should be placed below the surface of the liquid collected in the pressure tank.

With this invention, the liquid which has absorbed and so removed the targeted components from the exhaust gases is recirculated via the collection unit to the pressure tank, where it can be recovered and reused.

If the pipe which returns the liquid from the collection unit opened into the sealed space in the upper portion of the pressure tank, the gas pressure in the space would be lost as the gas escaped through the pipe into the absorption tower, and the tank would not remain pressurized.

With this invention, however, the pipe which returns the liquid from the collection unit to the pressure tank opens below the surface of the liquid collected in the pressure tank. This position allows the liquid in the pipe to act as a seal for the gas pressure in the tank. And because the collection unit is placed in a specified height in the absorption tower which is higher than the surface of the liquid collected in the pressure tank, the level of the liquid in the pipe communicating with the collection unit rises according to the pressure in the tank. The height differential of the pipe, the position of the collection unit and the pressure in the tank can be adjusted so that the level of the liquid in the pipe is below that of the collection unit. This will allow the gas pressure in the tank to be contained by the liquid in the pipe as it is recirculated from the recovery vessel to the pressure tank.

With this invention, the absorption liquid in the tower is sprayed upward and collected in a collection unit in the top of the tower. However, because some of the liquid generally drips to the bottom of the tower, it is not possible to collect 100% of the liquid using the collection unit only. When the liquid which collects on the bottom of the tower reaches a certain specified level, it should be returned to the pressure tank by a low-pressure pump. And because it is inevitable that some fraction of the liquid will escape with the gas, that fraction must be replaced via the pipe which supplies the raw materials.

The invention which is disclosed in claim 4 of this application comprises a wet gas processing apparatus in which the absorption liquid collected in the first liquid storage tank is conducted to the absorption tower and brought into contact with the flow of exhaust gases while being entrained at the flow velocity of those gases as they travel along the gas path in the tower. In this way the targeted components of the exhaust gases are absorbed and removed.

This processing apparatus is distinguished by the following. There is overflow ports on the side wall of pipes which create the overflow or a gushing currents in the many pipes for absorption liquid that are arranged in parallel orthogonal to the path traveled by the exhaust gases. The overflow currents travel in the direction orthogonal to that of the exhaust gases. More specifically, its path is virtually horizontal. The absorption liquid which is discharged from the overflow ports meets the flow of exhaust gas orthogonally, and the gas flow breaks it into small drops and effects liquid-vapor contact.

Instead of using a matrix of upward-facing spray nozzles to supply the absorption liquid as was done in the prior art (FIG. 21(B)), this invention has overflow ports which generate a virtually horizontal overflow or source flow. The absorption liquid propelled by the overflow ports make orthogonal contact with the flow of exhaust gases, which results in both atomization of the liquid and liquid-vapor contact.

With the invention disclosed in claim 5 of this application, the pipes to supply the absorption liquid are arranged in rows which are virtually orthogonal to the path of the exhaust gases along one or more surfaces of the tower. The pipes may be arrayed in one or more stages (including being spread in a vertical pattern). The flow of exhaust gases should be brought into the spaces between neighboring pipe arrays.

As is disclosed in claim 6 of this application, the pipes to supply the absorption liquid may comprise a pipe structure such that the tops of the pipes are open. A means to generate an overflow in a virtually horizontal direction, orthogonal to the direction in which the exhaust gases are propelled, may be provided in the pipe structure. Alternatively, as is disclosed in claim 7, the pipes may comprise a pipe structure such that the tops of the pipes are closed. Slits or rows of small holes may be provided along the pipes in the axial direction, on the peripheral surfaces of the pipes facing the spaces where the exhaust gases are introduced.

With this invention, the absorption liquid can be caused to gush or flow in a virtually horizontal direction toward the spaces between the neighboring pipes. This design lowers the cost of the equipment.

As is disclosed in claim 8 of this application, the absorption liquid may be supplied to the pipes using the force of gravity. More specifically, the source of the liquid may be placed slightly higher than the supply pipes.

This invention obviously does not exclude the use of a pump to supply the absorption liquid. If a pump is used, it should be small so that equipment cost and effort may be conserved.

With this invention, the path of the exhaust gases goes through a specified space where multiple rows of supply pipes for the absorption liquid are provided. This design has the effect of increasing the speed of the gas flow in the space so that it is boosted to a high velocity.

Also, with this invention, the absorption liquid is made to flow into the space where the exhaust gases have been speeded up and is brought into virtually orthogonal contact with this high-velocity gas flow. The liquid is perturbed and atomized by the energy of this gas. The abrupt compression and expansion of the exhaust gases in the space results in negative pressure, which causes minute droplets of the absorption liquid to rapidly disperse in the gas and become atomized. Efficient liquid-vapor contact is effected simultaneously as the liquid is supplied. In prior art apparatuses, the exhaust gases would be entrained and blown through the column of liquid before it was dispersed at the top of the tower. With this invention, significantly greater liquid-vapor contact is produced in a shorter time and with better efficiency. This results in highly efficient absorption and removal of targeted components from the exhaust gases.

The liquid-vapor contact is effected in the spaces between neighboring pipes, and the flowing liquid layer or linear flow of the absorption liquid is blown into the spaces. There is no need for a dense matrix of spray nozzles as in prior art apparatuses, resulting in a lower cost.

The supply pipes for the liquid comprise conduits. When the conduits are arranged in a vertical array, the path of the gas will wind between the conduits. As a result, the exhaust gases will undergo compression and expansion as they traverse the path. The liquid is atomized and formed into minute droplets from the time it exits the conduit.

The invention disclosed in claim 9 of this application comprises a wet gas processing apparatus in which the absorption liquid collected in the first liquid storage tank is sprayed in a specified direction (which may be upward, horizontally or downward) by a spray nozzle in the absorption tower. The sprayed liquid is brought into contact with the exhaust gases which are conducted into the tower, and the targeted components of the gases are absorbed and removed.

This processing apparatus is distinguished by the fact that the path of the exhaust gases conducted into the absorption tower may be adjusted over a wide region according to the volume of the gases, and by the fact that the adjustment is effected on the portion of the path where the exhaust gases flow into the tower.

With this invention, then, when load fluctuation in the boiler or other combustion apparatus causes the gas flow in the absorption tower to decrease so that the flow velocity of the gases negotiating the path decreases proportionally, the dimensions of the passage initially traversed by the gases can be controlled in response so that the flow velocity remains constant. The height of the spray from the spray nozzles can be kept constant, resulting in smooth entrainment of the liquid by the gas flow and stable liquid-vapor contact. The sulfur dioxide and particulate contained in the smoke can be effectively removed, and the liquid in the top of the tower can be recovered smoothly and continuously recycled to its tank.

In this case, as is disclosed in claim 10 of this application, the spray of liquid from the spray nozzles in the region where the gas flow has been obstructed can be halted. This will save the effort of driving the pump to no purpose and prevent the liquid from being recycled uselessly.

The invention disclosed in claim 11 of this application concerns a wet gas processing apparatus which enables the invention in claim 9 to be implemented easily. This processing apparatus is distinguished by the fact that it has a means to control the dimensions of the flow path of the gases. This apparatus segments the flow path of the gases introduced into the absorption tower into several flow regions by means of panels which run in the direction of the gas flow to the region where the liquid sprays from the spray nozzles. These panels allow the volume of flow entering each aforesaid segmented path to be controlled in proportion to the volume of gas supplied, and they allow each segment to be opened or closed off.

With this invention, if the volume of gas flowing into the tower decreases, causing the flow velocity of the gas travelling the course to decrease proportionally, one of the paths created by the panels can be closed off or constricted. In other words, the dimensions of the passage can be adjusted so that the flow velocity of the gas remains constant when its volume decreases.

The invention disclosed in claim 12 of this application sets forth an effective characteristic which is applicable when the apparatus disclosed in claim 11 is defined as a wet gas processing apparatus with a recovery vessel on the bottom of the tower and a spray nozzle above it on the inside of the tower from which the absorption liquid is sprayed upward. The lower end of at least one of the vertical panels running in the direction of the gas flow to the region where the liquid sprays from the spray nozzles extends down as far as the recovery vessel for the liquid. By adjusting the level of liquid in the recovery vessel, the user can at his discretion cause the lower edge of the panel to be immersed in the liquid. In this way the flow path of the gas, which is segmented by the panels, can be enlarged or constricted at the user's discretion.

In other words, the bottom edges of the panels are at different heights, so by adjusting the level of the liquid, we can selectively cause the bottom of any of the panels to be immersed.

An alternative to the configuration described above, which is disclosed in claim 13 of this application, would be to have at least one of the panels extending vertically along the direction of the gas flow to the region where the liquid sprays from the spray nozzles constructed so that its bottom edge was free to ascend from or descend to the recovery vessel for the absorption liquid. When the bottom of the panel is selectively lowered until it is immersed in the liquid, the path created by the panel is closed off.

With these configurations, adjusting the level of the liquid in the recovery vessel or selectively lowering the bottom of one of the panels until it is in the liquid provides an easy way to selectively close off one of the paths in the region where the gas flows.

Another means to control the flow of gas is disclosed in claim 14 of this application. The bottom of at least one of the panels extending along the path of the gas flow to the region where the liquid sprays from the spray nozzles is constructed so that it is able to swing. By altering the angle of this panel, we can control the volume of flow of the gas entering the path created by this panel or we can open or close off the path.

In other words, the angle of the bottom of the panel can be changed to close off or constrict the mouth of the path it adjoins, or the bottom of the panel can be lowered into the absorption liquid.

With this configuration, changing the angle at which the panel is hanging provides and easy way to control the volume of flow of gas into the flow region or open or close off the path entirely.

The invention disclosed in claim 15 of this application is distinguished by the following. The bottom of the panel can be moved toward the inlet through which the exhaust gases are conducted into the absorption tower. The flow of the gases conducted into the tower via the inlet is controlled by the movable piece as they are transported in the same direction in which the liquid is sprayed from the spray nozzles.

With this invention, the panel also functions to control the flow of the exhaust gases, resulting in better liquid-vapor contact.

The invention disclosed in claim 16 of this application is distinguished by the following. The panel can be moved so that it is virtually orthogonal to the direction in which the exhaust gases are flowing. Moving the panel will adjust the cross-sectional area of the passage.

With this invention, moving the panel in response to fluctuations in the volume of flow of the exhaust gases allows us to freely adjust the area of the cross section of the gas passage.

The invention disclosed in claim 17 of this application comprises a wet gas processing method in which liquid-vapor contact is effected when the absorption liquid is entrained by exhaust gases driven from the bottom of the absorption tower to its top. In this way the targeted components of the exhaust gases are absorbed by the liquid.

This processing method is distinguished by the following. When the flow velocity of the exhaust gases falls below a given value, the absorption liquid which has fallen into the recovery vessel on the bottom of the absorption tower is recirculated through a second tank to the first liquid storage tank from which absorption liquid is supplied to the tower.

The second tank may comprise the blowpit provided for purposes of maintenance; or a recirculation system consisting of the maintenance blowpit and a blowpit pump may be employed to recirculate the liquid through the second tank and into the first liquid storage tank.

The recirculation system for the absorption liquid which comprises the maintenance blowpit and blowpit pump has been employed in the prior art for temporary storage of the liquid in the tower while it was being cleaned. The capacity of the blowpit should be sufficient to hold all the liquid in the recovery vessel on the bottom of the tower while the tower is being cleaned, so it must be at least as large as the recovery vessel.

At times when not all the liquid sprayed from the spray nozzles reaches the mist eliminator, such as when the tower is being started up or shut down, some of the liquid will drip down into the recovery vessel. When an excessive volume of liquid has collected in the recovery vessel, it can be removed effectively into the large maintenance blowpit. This allows a smaller recovery vessel to suffice.

If the absorption liquid removed from the recovery vessel and placed in the blowpit or other second tank is not recirculated to the first liquid storage tank, the system will not be able to function smoothly after that point.

A pump is provided to return the liquid evacuated into the second tank to the first liquid storage tank after the maintenance or cleaning is completed. If the maintenance blowpit is used as the second liquid storage tank as is specified in this invention, the system can continue operating while this existing pump (i.e., the blowpit pump) is used to return the evacuated liquid to the second liquid storage tank.

With this invention, then, the absorption liquid can be continuously recirculated from the time the tower is started up until it is shut down without requiring an oversized recovery vessel or an additional or larger recirculation pump.

If the recirculation system for maintenance, which comprises the blowpit and the blowpit pump, is used in a system to return the liquid to the first liquid storage tank through a second tank, the liquid should be recirculated to the first liquid storage tank through the system when the tower is being started up or shut down.

During start-up and shut-down, all of the liquid which is sprayed will fall into the recovery vessel until the flow velocity of the exhaust gases reaches the loading velocity. However, if the liquid which has fallen is evacuated from the recovery vessel on the bottom of the tower into a second tank, it can be continuously returned to the first liquid storage tank via the recirculation path, thus enabling continuous recirculation from start-up to shut-down.

The invention which is disclosed in claim 18 of this application concerns a apparatus preferably used to implement the invention disclosed in claim 17. It comprises a wet gas processing apparatus in which liquid-vapor contact is effected as the absorption liquid is entrained by the exhaust gases forced from the bottom to the top of the absorption tower. In this way the targeted components of the exhaust gases can be absorbed by the absorption liquid.

This processing apparatus is distinguished by the fact that it has the following: a liquid recovery vessel on the bottom of the absorption tower; a second liquid storage tank which receives the liquid from the recovery vessel on the bottom of the absorption tower: a first liquid storage tank which supplies the liquid to the absorption tower; a recirculation path which connects the recovery vessel on the bottom of the tower to the first liquid storage tank by way of the second liquid storage tank; and a control device which recirculates the liquid in the recovery vessel on the bottom of the tower to the first liquid storage tank by way of the second storage tank when the flow velocity of the exhaust gases falls below a given value.

In this case, in order to implement the invention disclosed in the claim 18 more nearly preferably, certain devices should be furnished as described in claim 19, viz., a means to pressurize the first liquid storage tank for the absorption liquid and a means to control the pressurization device so as to keep the pressure of the liquid supplied to the tower most nearly constant.

If the maintenance recirculation system consisting of the maintenance blowpit and blowpit pump is used to recirculate the liquid to the first liquid storage tank by way of a second tank, during start-up and shut-down the entire volume of the liquid which is sprayed will fall into the recovery vessel. When this liquid is recirculated to the first liquid storage tank by way of the blowpit, the fluid level in the first liquid storage tank will become higher than it is during normal operation. Because the gravitational force will vary depending on how much liquid is added to the tank, the volume of the liquid fed to the supply device will vary, and the volume of liquid sprayed from the supply device will vary.

This invention addresses this problem by controlling the pressure in the space above the surface of the liquid in the first liquid storage tank. The pressure applied to the space above the liquid is controlled in response to variations in the gravitational force exerted by the liquid. In this way the liquid can be supplied in a stable fashion regardless of the height of the liquid in the first liquid storage tank.

The invention disclosed in claim 20 of this application comprises a method of processing exhaust gas in which an absorption tower is provided on the main path which links the boiler, combustor or other source of exhaust gases to the smokestack or other means by which the gases are exhausted to the atmosphere. In this absorption tower, the flow velocity of the exhaust gases is used to entrain an absorption liquid to the gases. The resulting liquid-vapor contact causes the targeted components of the exhaust gases to be absorbed by the liquid.

This processing method is distinguished by the fact that when the flow velocity of the exhaust gases in the absorption tower falls below a given value, the processed gases exhausted from the tower are returned to the inlet of the tower via a bypass.

In order to effectively implement the invention disclosed in claim 20, a apparatus for processing exhaust gases is proposed in claim 21. This apparatus is distinguished by the fact that it has a bypass by which the processed gases exhausted from the absorption tower may be returned to its inlet and a controller which causes the bypass to be opened so that the processed exhaust gases can be returned to the inlet of the tower when the flow velocity of the exhaust gases in the absorption tower falls below a given value.

With this invention, when the flow velocity of the exhaust gases in the tower falls below the loading velocity during start-up or shut-down of the tower, the bypass can be opened so that the processed exhaust gases are returned to the inlet of the tower. In this way the increased velocity of the gases from the boiler, combustor or other source of exhaust gases can be used, and the volume of flow can be augmented so that the flow velocity in the tower remains above the loading velocity.

As is disclosed in claim 22 of this application, a means is provided whereby the dimensions of the passage by which the exhaust gases enter the absorption tower can be changed. If the flow velocity of the gases in the tower falls below a given value, the passage can be constricted by the apparatus; and if this does not bring the velocity to the target value, a bypass can be opened so that the processed exhaust gases are returned to the inlet of the tower. This will boost the velocity of the exhaust gases conducted into the absorption tower and reduce the required fan power.

The means to change the dimensions of the gas passage may comprise panels in the absorption tower which extend vertically in the direction of the gas flow to the region where the liquid sprays from the spray nozzles. These panels would increase or decrease the width of the passage for the exhaust gases so as to maintain the flow velocity above the loading velocity. They would allow the velocity of the gases in the tower to be boosted significantly when the volume of gas in circulation is small.

The invention disclosed in claim 23 of this application comprises a wet gas processing apparatus in which the liquid which collects in the bottom of the absorption tower is sprayed from spray nozzles in the tower. Liquid-vapor contact is effected as this spray is entrained on the exhaust gases moving from the bottom to the top of the tower. The targeted components of the exhaust gases are absorbed and removed, and the liquid entrained to the gas in the form of mist is captured by a mist eliminator in the top of the tower.

This processing apparatus is distinguished by the following. Below the mist eliminator there is a recovery vessel which receives the liquid that falls from the mist eliminator. The top of an appropriate length of pipe communicates with the bottom of this recovery vessel. On the bottom of this pipe an aperture is provided through which the liquid carried by the pipe is released at a specified location in the tower.

With this invention, when the exhaust gases in the absorption tower are flowing at a high velocity, so that the volume of liquid entrained to the gases which reaches the mist eliminator increases substantially, the liquid which falls from the mist eliminator goes into a recovery vessel and is drained via a pipe of an appropriate length to a location inside the tower. With this configuration, even when only a very small volume of the mist entrained to the scrubbed exhaust gases and exhausted from the tower is collected, and the velocity of the gases inside the tower (the entrainment velocity) is high, the volume of mist (minute droplets) contained in the scrubbed gases and exhausted from the tower can be minimized as much as possible. This method improves the efficiency of the gas processing operation, so it is extremely beneficial.

In the embodiments which will be discussed shortly, the spray nozzles in the illustrations face upward, creating a vertical jet which gushes upward. However, the spray nozzles comprised by this invention are not exclusively limited to an upward orientation. Only in claim 24 are upward-facing spray nozzles integral to the invention.

The invention disclosed in claim 24 of this application is distinguished by the following. The spray nozzles face upward, and the outlet at the bottom of the connecting pipe is placed above the height of the jet sprayed from the spray nozzles, preferably below the collection zone for the dispersed liquid which is directly below the mist eliminator and above the height of the jet sprayed from the spray nozzles. It would be more nearly preferable if, as is disclosed in claim 25, the outlet at the bottom of the carrier pipe is formed into a spray nozzle, and the liquid propelled from the outlet can be sprayed toward the jet.

With this invention, the liquid transported through the carrier pipe to the absorption unit directly above the jet spray (at the top of the column of liquid) joins with the jet sprayed from the spray nozzles so that it absorbs the noxious components of the gas for a second time, enhancing the effectiveness of the scrubbing operation and maintaining the processing capability at a high level.

The invention disclosed in claim 26 of this application is distinguished by the fact that the outlet on the bottom of the carrier pipe is placed in the liquid recovery vessel.

This invention allows the liquid to be transported smoothly to the recovery vessel and reused when the volume of liquid which reaches the mist eliminator substantially increases.

BRIEF DESCRIPTION OF THE DRAWINGS

FIG. 4 shows two ways in which the conduits shown in FIG. 3 for the absorption liquid may be arranged.

FIG. 5 illustrates a partial perspective drawing showing the flow of absorption liquid through conduits shown in FIG. 4.

FIG. 6 shows another embodiment of the conduits pictured in the embodiment discussed above. FIG. 6(A) shows the bottoms of conduits 31 comprise pipes, whose cross sections are semicircles.

FIG. 6(B) shows conduits whose cross sections are hollow circles.

FIG. 6(C) shows conduits whose cross section is an ellipse. FIG. 6(D) shows conduits which have, facing spaces, numerous small holes at intervals along the axial direction. FIG. 6(E) shows conduits which have, facing spaces, numerous slits at intervals along the axial direction.

FIG. 23 is a graph of the experimentally verified relationship between the velocity of the gases in the tower and the rate at which the mist is dispersed at the inlet of the mist eliminator.

PREFERRED EMBODIMENTS OF THE INVENTION

Figure 1:
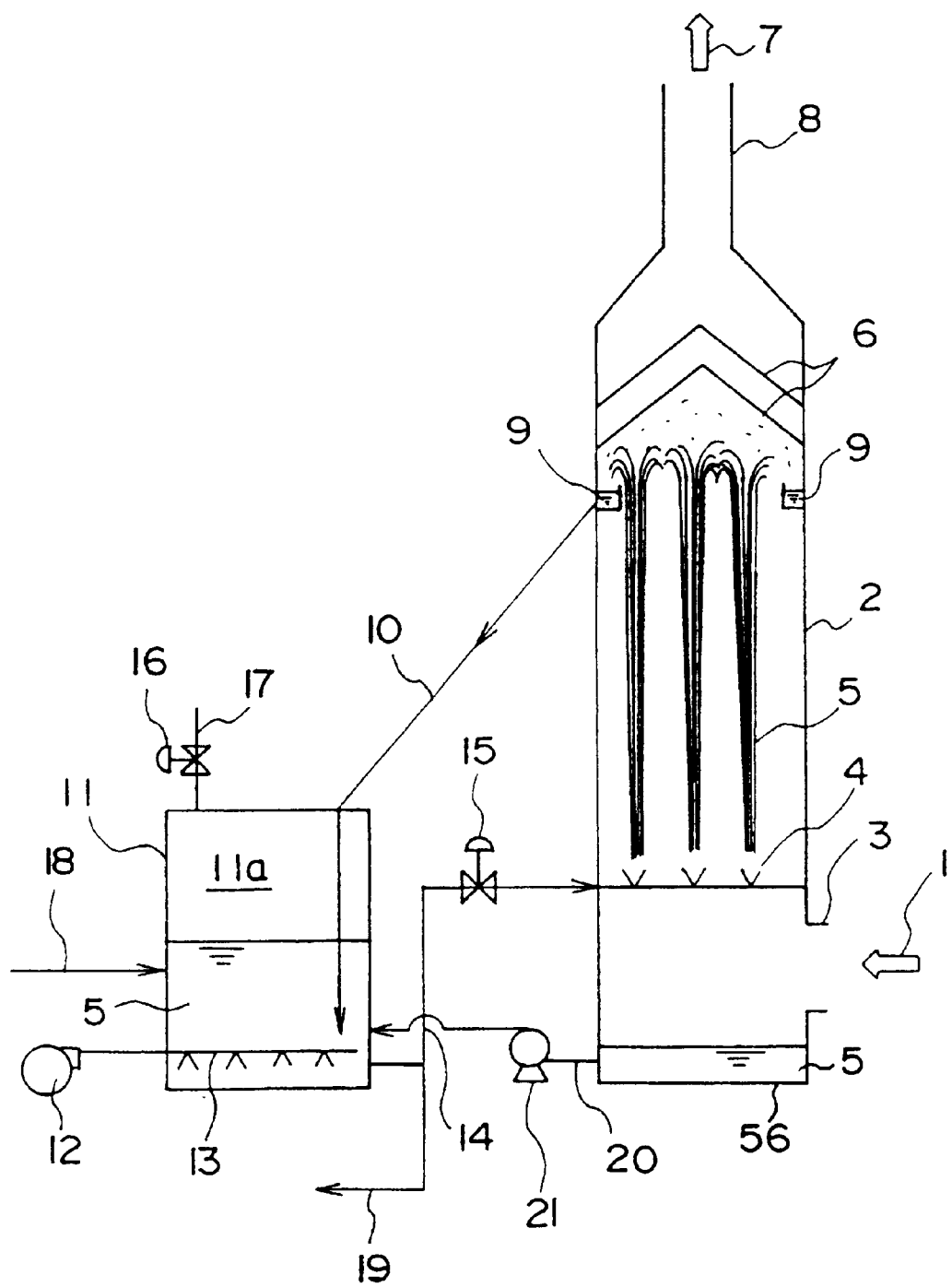
FIG. 1 is a rough sketch of a wet gas processing apparatus which is related to the first embodiment of this invention.

FIG. 1 is a rough sketch of a wet gas processing apparatus which is related to the first embodiment of this invention.

In this figure, the exhaust gases 1 from the boiler or other combustion device are conducted into inlet 3 in the lower portion of absorption tower 2. The exhaust gases 1 which are conducted into the tower are brought in contact with the absorption liquid 5 supplied through spray nozzles 4 in the lower portion of the interior of the tower, and the targeted components of the gases are transferred from the gases to absorption liquid 5.

The fact that the targeted components of the gases can combine with the absorption liquid indicates that they are either soluble substances or particulate. In this embodiment, the targeted component is sulfur dioxide ($SO_2$), which is soluble in an absorption liquid; and a slurry containing limestone, an absorbent, is used as the absorption liquid.

In this embodiment, the spray nozzles are upward-facing spray nozzles 4. When the absorption liquid 5 is sprayed upward from the spray nozzles 4, the exhaust gases 1 introduced through the inlet 3 are entrained to the jets 5a of absorption liquid sprayed from the spray nozzles 4. Liquid-vapor contact is effected when the gases are forced to pass through the jets of absorption liquid 5.

A mist eliminator 6 is provided in the upper portion of absorption tower 2 near the apex of the jets. The mist eliminator 6 removes the absorption liquid 5 which is entrained to gases 1.

After the targeted components have been removed by absorption liquid 5 in tower 2 and the entrained absorption liquid 5 has been removed by mist eliminator 6, the scrubbed gases 7 are ultimately transported through exhaust vent 8 into the atmosphere or to a required later-stage processing apparatus (not pictured).

A collection unit 9 with an open top is placed on the interior periphery of absorption tower 2 below the mist eliminator. The absorption liquid 5 captured by the mist eliminator 6 collects in collection unit 9 and falls into pressure tank 11 through connecting pipe 10.

The pressure in tank 11 is set so that the jets of absorption liquid 5 sprayed from the supply nozzles 4 go higher as exhaust gases 1 flow faster and so that they go higher than the collection unit 9.

The upper end of connecting pipe 10 communicates with the bottom of collection unit 9. Connecting pipe 10 goes through the top of pressure tank 11, and its lower end is in a location in the tank 11 where it is normally submerged. In this way the connecting pipe 10 creates a gas seal in pressure tank 11.

In other words, although the absorption liquid 5 which collects in collection unit 9 flows into pressure tank 11 through pipe 10, the air in the sealed space 11a above the liquid in pressure tank 11 is pressurized, so the liquid 5 in tank 11 experiences a backflow. The level of the liquid in pipe 10 rises in proportion to the pressure in tank 11. By adjusting the differential between the top and bottom of pipe 10, the position of collection unit 9 and the pressure in tank 11 so that the level of the liquid in the connecting pipe 10 is lower than collection unit 9, we can make it possible for the absorption liquid 5 in collection unit 9 to return to pressure tank 11 and for the liquid 5 in pipe 10 to preserve the gas pressure seal in tank 11.

On the bottom of pressure tank 11 are air compressor 12 and gas blower pipe 13, which is connected to compressor 12. Compressed air, in other words a gas containing oxygen, is blown into the stored liquid.

The role of this compressed gas is twofold. Its first function is to maintain the pressure in the sealed space 11a in pressure tank 11. Its second function occurs when the liquid 5 which has absorbed $SO_2$ through liquid-vapor contact and is now a slurry containing limestone comes in contact with the gas containing oxygen. This contact causes the $SO_2$ to oxidize, thus generating calcium sulfate dihydrate (gypsum).

The pressure in sealed space 11a of tank 11 is used to circulate the absorption liquid 5 stored in pressure tank 11 through supply pipe 14 and valve 15, which controls the volume of flow, to spray nozzles 4 in absorption tower 2.

We shall now discuss the configuration of the pressure tank 11.

On the top of pressure tank 11 are exhaust pipe 17 and valve 16, which controls the pressure in the tank 11. On the lateral wall of the tank are pipe 18, through which raw materials such as neutralizing agents are supplied, and pipe 20, through which the absorption liquid 5 from recovery vessel 56 on the bottom of tower 2 is transported by circulation pump 21.

Pipe 19 removes the gypsum which forms when the $SO_s$ is oxidized on the bottom of tank 11.

We shall next discuss the reasons why pressure tank 11 is configured as described above.

With this embodiment, even though much of the absorption liquid 5 sprayed upward in tower 2 is collected in collection unit 9 in the top of the tower, some of the liquid 5 inevitably escapes with the gases, and some of it falls to the bottom of the tower. The collection unit 9 will never collect 100% of the absorption liquid. When the level of the liquid which collects on the bottom of absorption tower 2 reaches a given level, it is returned to pressure tank 11 by pump 21.

Neutralizing agents and the like are supplied to pressure tank 11 through supply pipe 18, and a portion of the liquid is removed via pipe 19 and circulated to the gypsum recovery process. In this embodiment, then, the supply of absorption liquid through pipe 18, the volume of liquid removed to the gypsum recovery process (not pictured) and the volume of liquid which escapes with the gases must be balanced so as to maintain the level of liquid in pressure tank 11.

The volume of air supplied to pressure tank 11 by air compressor 12 is determined in response to the volume of $SO_2$ in the exhaust gases. Thus the air pressure in tank 11 is controlled by balancing the volume of liquid exhausted through pipes 14 and 19, the volume of liquid supplied through pipes 10, 18 and 20 and the volume of air introduced by compressor 12.

If the balance is lost and the pressure in the tank exceeds a given value, pressure control valve 16 will automatically open, allowing pressure to escape until the internal pressure in the tank returns to the given value. In this way the pressure in the tank can always be kept at a set value.

The effect of the apparatus indicated in the embodiment was verified by the following experiment.

Figure 2:
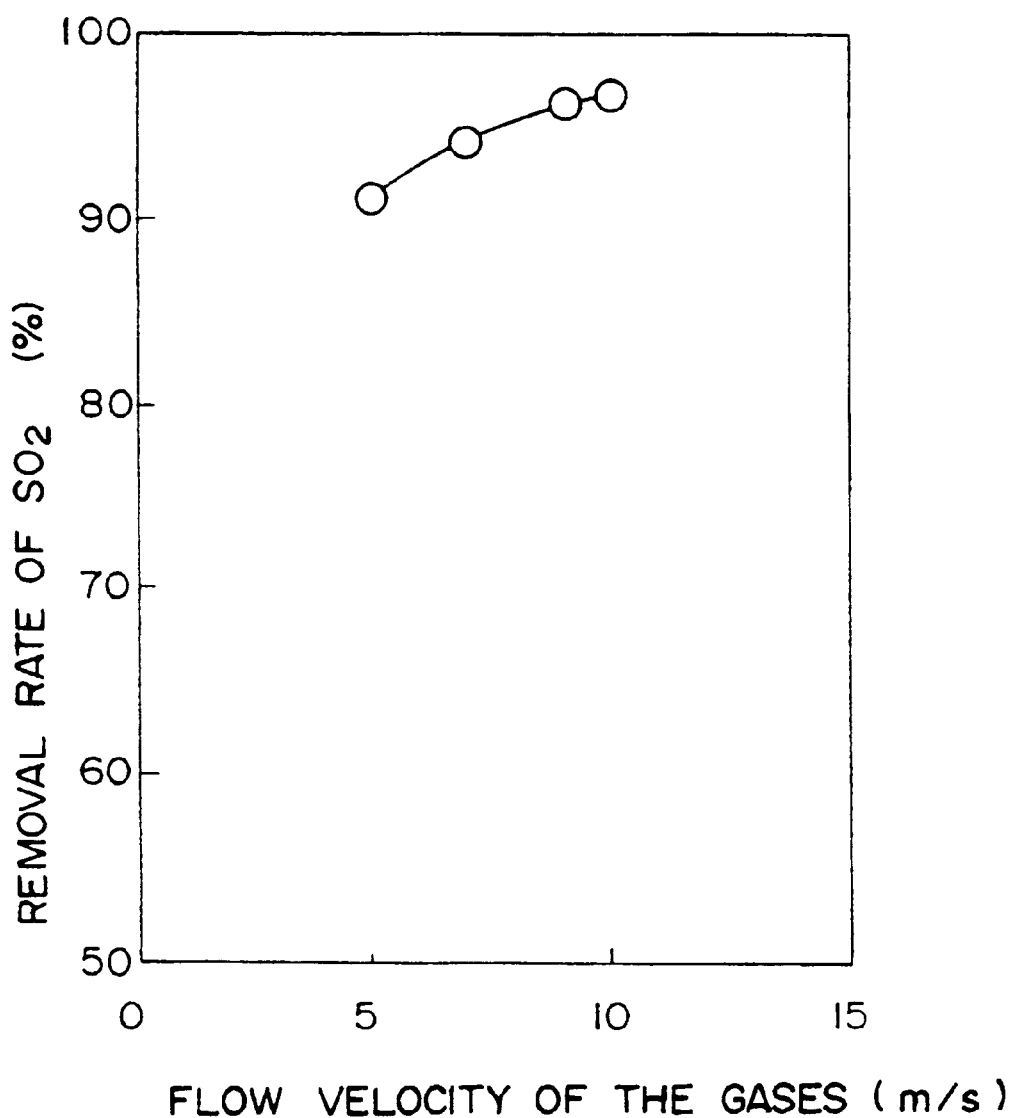
FIG. 2 is a graph of a sample relationship between the flow velocity of the gases and the rate at which the $SO_2$ is removed in a gas processing apparatus shown in FIG. 1.

FIG. 2 is a graph of a sample relationship between the flow velocity of the gases and the rate at which the $SO_2$ is removed in a gas processing apparatus according to this invention when the absorption liquid is a slurry containing calcium sulfate and the flow of the liquid in circulation is constant. The vertical axis represents the removal rate of $SO_2$, and the horizontal axis represents the flow velocity of the gases.

From this experiment it is clear that in general, the rate of removal of sulfur dioxide which can be attained is above 90% over a wide range of flow velocities.

So even if the gas flow decreases when the load on the boiler or other source of exhaust gases fluctuates, better than 90% of the sulfur dioxide can still be removed.

Also, in this experiment almost all the absorption liquid was collected in the collection unit 9 shown in FIG. 1, so the process ran quite smoothly. When the velocity of the gas flow decreased, we boosted the pressure in tank 11 to insure that the liquid 5 would reach the top of the tower. In this case, too, almost all of the liquid 5 was collected in collection unit 9.

With this embodiment, then, the absorption liquid can be recovered consistently without using a pump, even when the flow velocity of the gas to which the liquid is entrained decreases.

In this embodiment, the tank is pressurized by means of a gas under pressure such as compressed air. There is thus no need to keep the level of the liquid in the tank higher than the spray nozzles which spray the liquid into the tower. The pressure tank may be placed lower than in prior art apparatuses, enhancing the freedom of design. As has been discussed, if the absorption liquid 5 cannot be entrained because the flow velocity of the gases in tower 2 has fallen due to a load fluctuation, the pressure in the tank can be increased so that the liquid will go up as high as the mist eliminator. This will insure that the liquid can be recovered.

Figure 3:
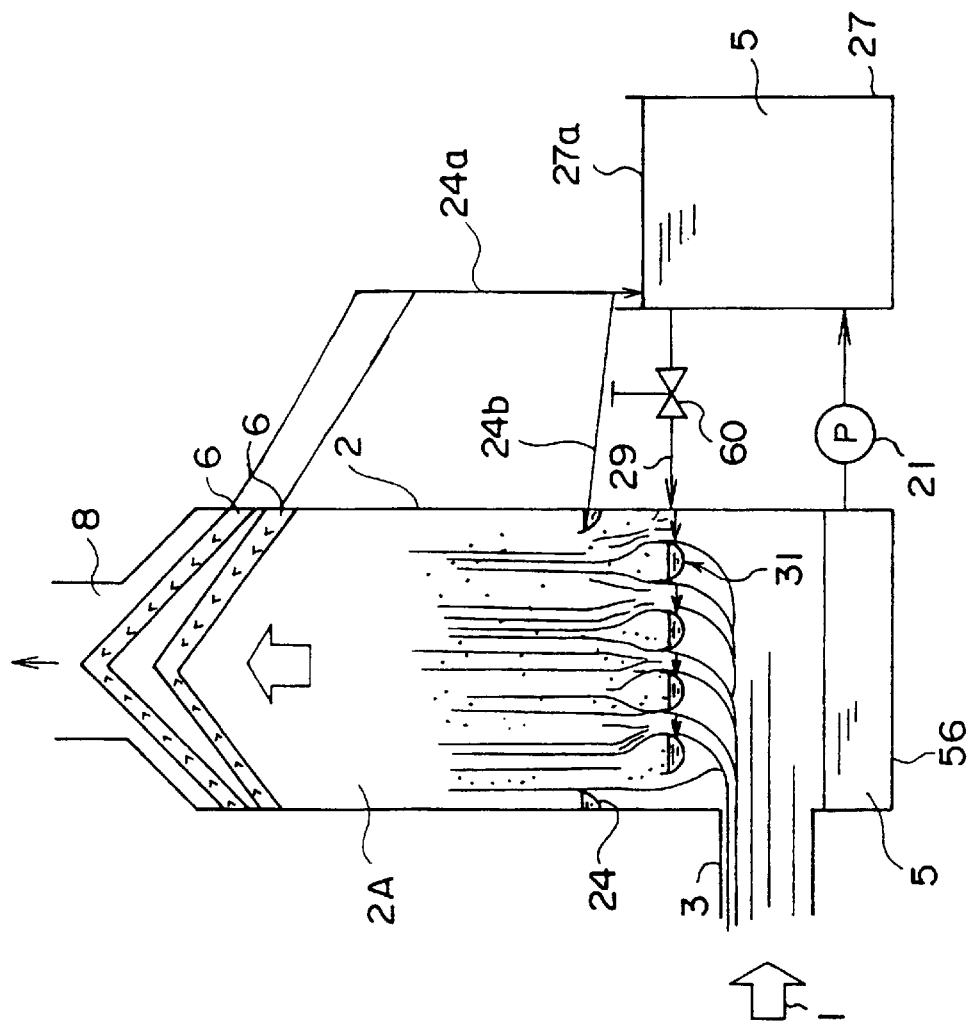
FIG. 3 is a rough sketch of a wet gas processing apparatus which uses a gravity feed to supply the absorption liquid according to the second preferred embodiment of this invention.

FIG. 3 is a rough sketch of a wet gas processing apparatus which is the second preferred embodiment of this invention. This apparatus does not employ the upward-facing spray nozzles of the previous embodiment, but uses a gravity feed to supply the absorption liquid.

As can be seen in the drawing, the exhaust gases 1 from the boiler or other combustion device are introduced into the bottom of absorption tower 2 via smoke inlet 3. They travel along gas path 2A, which extends upward in the tower, creating a vertical flow. The gases pass through mist eliminator 6 and are exhausted via exhaust vent 8 on the top of the absorption tower.

A recovery vessel 56 is provided on the bottom of absorption tower 2. Here the absorption liquid 5, now a slurry of lime, which falls from the top of tower 2 is collected and circulated to first liquid storage tank 27 by pump 21.

At the start of gas path 2A, directly above smoke inlet 3, numerous conduits 31 with open tops are arranged in parallel in horizontal arrays which are orthogonal to each other. The level of liquid in first liquid storage tank 27, which supplies the absorption liquid to the conduits 31, is slightly higher than the level of liquid in the conduits. Using the gravitational force of an appropriate fall, liquid 5 is brought into head pipes 190 (See FIG. 5) in the tower via pipe 29 and valve 60. It travels through head pipes 190 to conduits 31, where it forms a thin layer on the upper surface of the lateral walls of each conduit which overflows into the spaces 30 between the conduits. (See FIGS. 4 and 5.)

The level 27a of the liquid in first liquid storage tank 27 is kept slightly higher than the level of the liquid in the conduits 31, so the volume of liquid 5 which is recovered by pump 21 and pipe 24a and the volume of fresh liquid supplied are adjusted in response to the volume of recovered liquid which is supplied to the tower via valve 60.

Figure 4A:
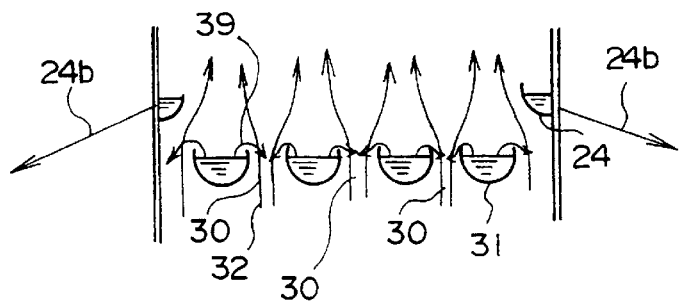
In FIG. 4(A), shows gas paths when the conduits are arranged in parallel in one horizontal plane.

FIG. 4 shows two ways in which the conduits 31 for the absorption liquid may be arranged. In FIG. 4(A), the conduits are arranged in parallel in one horizontal plane, virtually transecting the entry to gas path 2A. Exhaust gases 32 flow through the spaces 30 in between the conduits. To recover the absorption liquid 5 which drips down the interior walls of tower 2 as a limestone slurry, 90° arc-shaped pipes 24 are provided on both the left and right walls of the tower.

With this configuration, numerous conduits 31 are arranged in parallel at given intervals 30 in the entry to the gas path 2A. This reduces the size of the channel through which the gas must pass, thus accelerating it to a high speed. The absorption liquid 5 overflows (39) into the spaces 30 which are instrumental in accelerating the gas flow 32. The overflow thus comes into orthogonal contact with the rapidly rising gas flow 32. The energy imparted by high-speed gas flow 32 perturbs liquid 5 and converts it to mist.

The liquid 5 which collects in curved catchment pipes 24 is again borne upward by the gas, thus reducing the work required of pump 21.

Figure 4B:
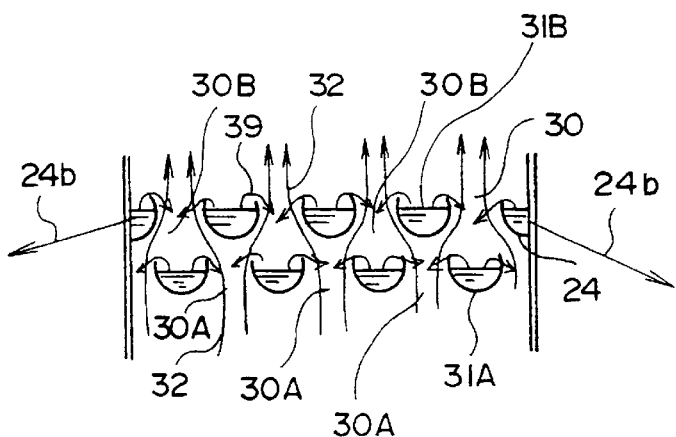
In FIG. 4(B), shows gas paths when two levels of conduits are staggered in two horizontal planes which virtually transect the entry to the gas path.

In FIG. 4(B), two levels of conduits, 31A and 31B, are staggered in two horizontal planes which virtually transect the entry to the gas path 2A. The gas flow 32 is forced through the spaces 30A and 30B between conduits 31A in the lower plane and 31B in the upper plane. When the passage through which gas flow 32 must go is narrowed to spaces 30A between conduits 31A in the first plane, it is boosted to a higher velocity. Absorption liquid 5 is released into the spaces 30A where the velocity of the gas flow 32 increases. Up until the point when the liquid makes orthogonal contact with rapidly ascending gas flow 32, its action is that shown in FIG. 4(A). When it is released into the space between the first set of conduits 31A and the second set 31B, the deceleration of the gas flow 32 and the expansion of the gas cause the high-speed fluid of exhaust gases 1 to have negative pressure. At the surface of the first set of conduits 31A where the absorption liquid 5 is released, it is broken into fine particles and turned into a mist. The gas is again compressed and accelerated when it travels through the spaces 30B between conduits 31B in the second plane. The same operation is executed as was described above, resulting in more effective liquid-vapor contact. It would also be possible to use three or more sets of conduits.

FIG. 5 illustrates the flow of absorption liquid 5 through conduits 31 in the FIG. 4(A).

In this figure, head pipe 190, which is connected to pipe 29, through which the absorption liquid enters the system, might run around the interior wall of the tower. Conduits 31 are arranged parallel to each other and orthogonal to the axis of pipe 29. One end of each conduit 31 communicates with each opening 190a on the lateral surface of the head pipe 190.

Figure 5A:
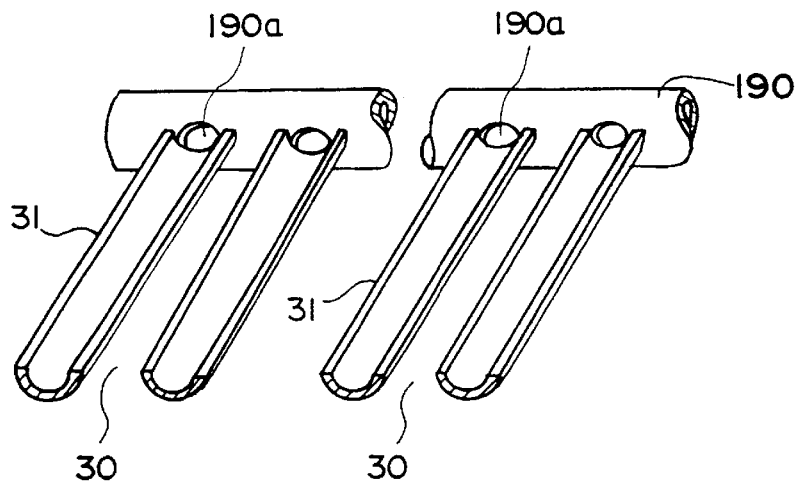
FIG. 5(A) shows the conduits without notches on the upper edges of the lateral walls.

As can be seen in FIG. 5(A), the tops of the lateral walls of the conduits 31 have a horizontal surface. The absorption liquid 5 overflows conduits 31 along their entire length and goes into the spaces 30 between the conduits.

Figure 5B:
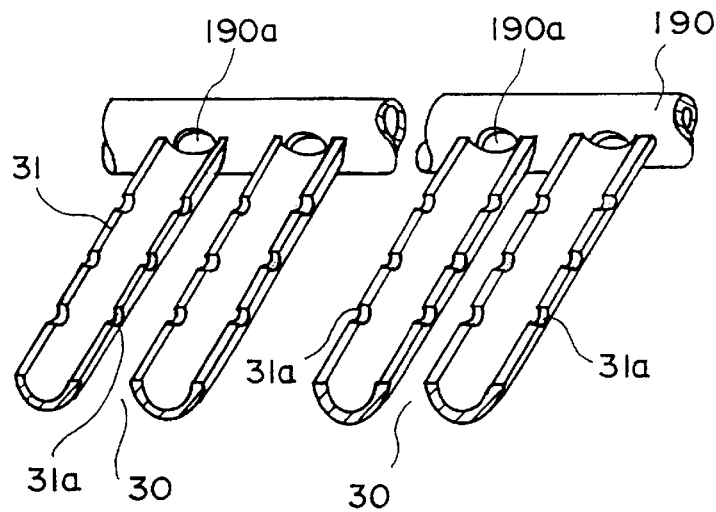
FIG. 5(B) shows the conduits with notches on the upper edges of the lateral walls.

Because it is extremely difficult to provide a horizontal edge on the lateral walls of conduits 31, another possible configuration is shown in FIG. 5(B). A number of notches 31a are provided on the upper edges of both lateral walls of conduits 31, at regular intervals in the axial direction. Through these notches 31, an intermittent overflow 39 is generated which goes into spaces 30, making orthogonal contact with high-speed gas flow 32.

With this embodiment, the exhaust gases 1 which are brought into absorption tower 2 move directly into the thin layer of horizontally moving overflow. When the gases pass through the spaces 30 between the many parallel conduits 31, a rapidly ascending gas flow is created. (The speed of the gas in the tower is approximately 10 m/s.) This flow makes orthogonal contact with absorption liquid 5 as described above. The energy imparted by this contact breaks liquid 5 apart and creates a mist. The liquid is dispersed in the ascending gas flow which expands turbulently above conduits 31. The negative pressure at the open surfaces of conduits 31 also causes the liquid 5 on the upper surfaces of the conduits to become a mist. As this mist is dispersed and mixed with the gas, efficient liquid-vapor contact occurs, forming a gas in which the liquid and vapor are dispersed.

The gas in which the liquid and vapor are dispersed creates liquid-vapor contact zone 2A in the upper part of the tower. As the gas rises to mist eliminator 6 in the top of the tower, the targeted components are removed from exhaust gases 1 and absorbed by liquid 5.

Because the targeted component in this embodiment is sulfur dioxide ($SO_2$), which is soluble in liquid 5, a slurry containing limestone, an absorbent, is used to promote the combination of the noxious component with absorption liquid 5.

When the exhaust gases which reach the liquid-vapor contact zone 2A, the absorption liquid 5 dispersed among and entrained to the gases is recovered by mist eliminator 6 and recycled to first liquid storage tank 27 via pipe 24a. The liquid 5 which is recovered recirculates from arc-shaped troughs 24, which run along the interior walls of the tower, to first liquid storage tank 27 by way of pipe 24b.

In absorption tower 2, the targeted components are absorbed by liquid 5, and the entrained liquid 5 is separated by mist eliminator 6. Exhaust gases 1, which are now scrubbed gases, are finally transported via exhaust vent 8 to the atmosphere or to another device downstream (not pictured).

FIG. 6 shows another embodiment of the conduits pictured in the embodiment discussed above. The conduits 31 here comprise troughs whose upper surfaces are occluded. On the upper portion of the lateral surfaces of the conduits 31, the surfaces which face spaces 30 through which the gas flow 32 is conducted, are slits or numerous small holes which run along the axial direction of the conduit. In this case, the bottom surfaces of conduits 31 should be formed, as shown in the drawing, so that their cross sections are a curve (e.g., they might be round, streamlined or shaped like drops), wedge or triangle which mitigates the resistance of the fluid. In FIG. 6(A), the bottoms of conduits 31 comprise pipes 31c, whose cross sections are semicircles. The tops of pipes 31c are covered by flat panels 31d. On both lateral walls of the conduits, facing spaces 30, numerous small holes 36 or slits 37 are provided at intervals along the axial direction. (See FIGS. 6(D) and (E).)

In the embodiment shown in FIG. 6(B), conduits 34 have a cross section which is a hollow circle. Along the generatrix of a horizontal cross section which includes the axis, numerous small holes 36 or slits 37 are provided at intervals along the axial direction. (See FIGS. 6(D) and (E).)

In the embodiment shown in FIG. 6(C), conduits 35 have a cross section which is an ellipse. Along the generatrix of a horizontal cross section which includes the axis, numerous small holes 36 or slits 37 are provided at intervals along the axial direction. (See FIGS. 6(D) and (E).) It is not crucial that holes 36 or slits 37 be located along the generatrix of a horizontal cross section which includes the axis; they might be placed above or below the axis as well.

With these embodiments, then, the absorption liquid 5 overflows or runs out horizontally into the spaces between the conduits, rather than being sprayed upward by spray nozzles as in prior art apparatuses. This results in reduced equipment costs and a savings in energy.

Preferably, in these embodiments the absorption liquid is supplied to the conduits using the force of gravity. However, this invention does not preclude the use of a pump to supply the absorption liquid. If a pump is used, it should be small so that equipment costs can be reduced.

With these embodiments, a number of conduits are arranged in rows at given intervals 30 at the entry of the gas path 2A. This results in efficient liquid-vapor contact between gas flow 32 and liquid 5 in the spaces 30 at the same time that the liquid is supplied. In prior art apparatuses, the exhaust gases would be entrained and blown through the column of liquid before it was dispersed at the top of the tower. With this invention, significantly greater liquid-vapor contact is produced in a shorter time and with better efficiency. This results in highly efficient absorption and removal of targeted components from the exhaust gases, and in the break-up and dispersion of liquid 5 in a shorter time. Both of these effects are linked to lower equipment costs.

Figure 7:
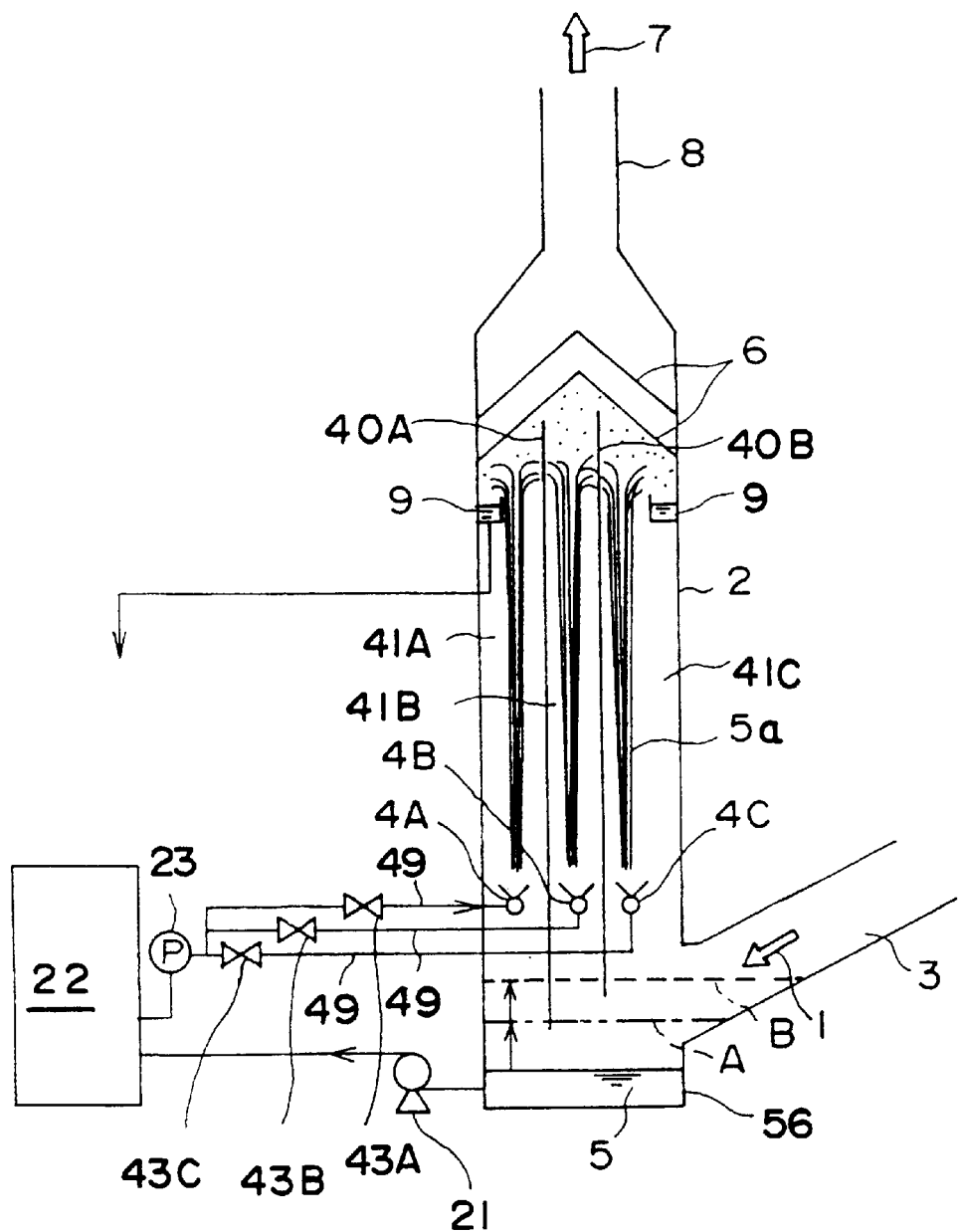
FIG. 7 is a rough sketch of a wet gas processing apparatus which is the third preferred embodiment of this invention.

FIG. 7 is a rough sketch of a wet gas processing apparatus which is the third preferred embodiment of this invention.

In this figure, the exhaust gases 1 from the boiler or other combustion device are conducted into inlet 3 in the lower portion of absorption tower 2. The exhaust gases 1 which are conducted into the tower are brought in contact with the absorption liquid 5 supplied through sets of spray nozzles 4A through 4C in the lower portion of the interior of the tower, and the targeted components of gases 1 are transferred from the gases to absorption liquid 5.

In this embodiment the component which combines with the absorption liquid 5 is sulfur dioxide ($SO_2$), which is soluble in liquid 5, and so a slurry containing limestone, an absorbent, is used as the absorption liquid.

Recovery vessel 56 is on the bottom of absorption tower 2. In it, the lime slurry or other absorption liquid collects. Recovery vessel 56 is connected to the feeder pipes 49 for sets of spray nozzles 4A through 4C by way of recirculation pump 21, buffer tank 22, spray nozzle pump 23 and valves 43A through 43C.

The sets of spray nozzles comprise upward-facing arrays 4A through 4C. When the absorption liquid 5 is sprayed upward from the spray nozzle arrays 4A through 4C, the exhaust gases 1 introduced through the inlet 3 are entrained to the jets 5a of absorption liquid 5 sprayed from the spray nozzles 4A through 4C. Liquid-vapor contact is effected when the gases are forced to pass through the jets 5a of absorption liquid 5.

A mist eliminator 6 is provided in the upper portion of absorption tower 2 near the apex of the jets. The mist eliminator 6 removes and recycles the absorption liquid 5 which is entrained to gases 1.

After the targeted components have been removed by absorption liquid 5 in tower 2 and the entrained absorption liquid 5 has been removed by mist eliminator 6, the scrubbed gases 7 are ultimately transported through exhaust vent 8 into the atmosphere or to a required later-stage processing apparatus (not pictured).

A collection unit 9 with an open top is placed on the interior periphery of absorption tower 2 below the mist eliminator. The absorption liquid 5 captured by the mist eliminator 6 collects in collection unit 9. It may be recirculated and reused as needed after passing through buffer tank 22.

Since the jet of absorption liquid 5 sprayed from the upward-facing spray nozzle arrays 4A through 4C is pushed upward by the velocity of exhaust gases 1, a velocity should be selected which propels the liquid above the collection unit 9. Generally, the load on the boiler or other source of exhaust gases will vary. If the volume of flow of the gases decreases, the drop in velocity will result in less absorption liquid 5 being entrained, as was discussed earlier.

In this embodiment, this is addressed by providing three spray nozzle arrays, 4A through 4C, on the left, center and right-hand sides of the drawing. Valves 43A through 43C on the pipes 49 which lead to spray nozzles 4A through 4C can be opened or closed independently to allow each of the spray nozzle arrays to spray liquid 5 or be shut down. Although it appears in the drawing that each of spray nozzle arrays 4A through 4C has only a single spray nozzle, in reality each contains a number of spray nozzles connected in a row which goes back into the drawing.

Between the left-hand spray nozzle array 4A and central spray nozzle array 4B, and between array 4B and the right-hand spray nozzle array 4C are vertical panels 40A and 40B.

The upper edges of the panels 40A and 40B extend above the collection unit 9 to the level where mist eliminator 6 is mounted. The lower edges of the two panels are at different heights. Panel 40A hangs down as far as level A in recovery vessel 56; panel 40B hangs down only as far as level B. The panels 40A and 40B form three different channels through which the gases can flow: 41A, 41B and 41C.

In this embodiment, controlling the drive to a pump causes the liquid 5 in the recovery vessel 56 to rise. When the level rises to A, the bottom of panel 40A is submerged in liquid 5, and the entry to the left-hand gas channel 41A is occluded. The exhaust gases 1 introduced via inlet 3 are forced to flow through central channel 41B and right-hand channel 41C only. When valve 43A to left-hand spray nozzle array 4A is closed, the volume of the channel through which the gas flows, now reduced to center and right channels 41B and 41C only, is ⅔ of its former size.

As a result, the velocity of the flow can be held constant even if the volume of flow is reduced by a third. Liquid 5 will still be entrained to the flow, and the height of the jets sprayed from spray nozzle arrays 4B and 4C will remain constant. The liquid-vapor contact between absorption liquid 5 and gas flow 32 will continue apace.

When the level of the liquid rises to B, the bottoms of both panels 40A and 40B are submerged in liquid 5, and the entries to left-hand gas channel 41A and central channel 41B are occluded. The exhaust gases 1 introduced via inlet 3 are forced to flow through right-hand channel 41C only. When valves 43A and 43B to left-hand and central spray nozzle arrays 4A and 4B are closed, the volume of the channel through which the gas flows, which now comprises 41C only, is ⅓ what it was. As a result, the velocity of the flow can be held constant even if the volume of flow is reduced by two thirds.

With this embodiment, then, when the volume of gas flowing in absorption tower 2 decreases and the flow velocity experiences a proportional drop, one of channels 41A through 41C, which are formed by the panels 40A and 40B, can be closed off. In this way the volume of the passage can be controlled in response to a decreased volume of flow so that the flow velocity remains constant despite the decrease.

Figure 8:
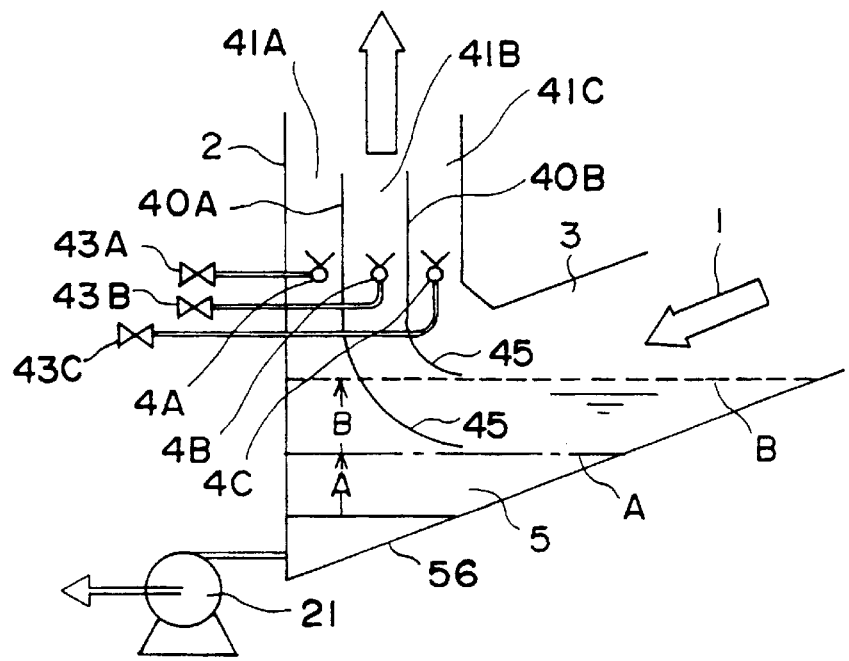
FIG. 8 shows a partial rough sketch of a wet gas processing apparatus which shows another type of panel shown in FIG. 7 according to the first modification.

FIG. 8 shows a modification of the embodiment in FIG. 7. The bottom ends of the panels 40A and 40B are given curves 45, which bend them into J-shapes facing the inlet 3 through which smoke is conducted into absorption tower 2.

With this embodiment, the exhaust gases 1 which are conducted into absorption tower 2 travelling on a downward slope through the smoke inlet 3 are forced to move along the J-shaped curves 45 so that they are rectified to a purely vertical flow, which is the same direction as the spray from spray nozzle arrays 4A through 4C. Thus the panels 40A and 40B can also serve to rectify the flow of the exhaust gases. This enhances the effectiveness of the liquid-vapor contact.

Figure 9:
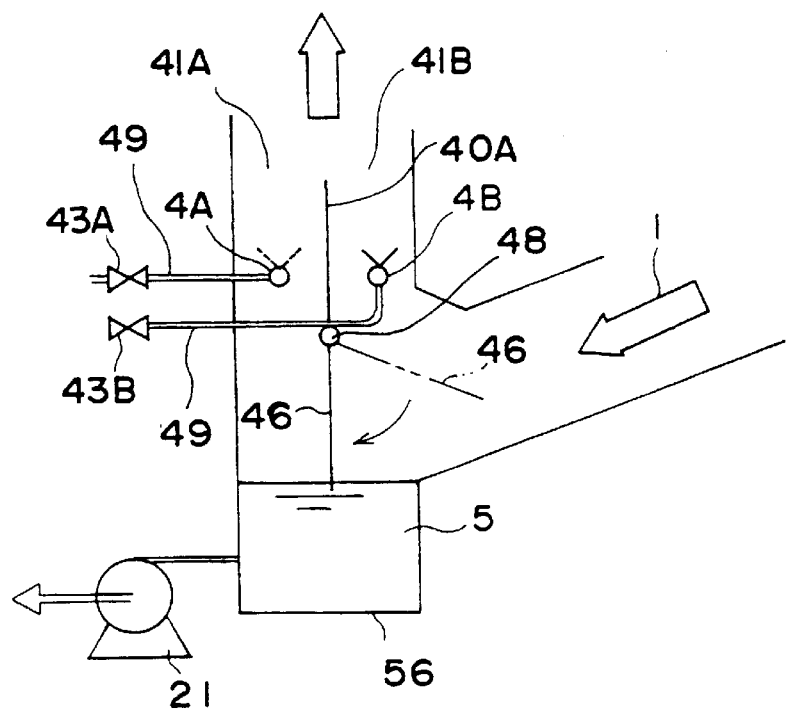
FIG. 9 shows a partial rough sketch of a wet gas processing apparatus which shows another type of panel shown in FIG. 7 according to the second modification.

FIG. 9 shows another preferred embodiment of this invention. Here there are two upward-facing spray nozzle arrays, 4A and 4B, on the left and right in the drawing. Valves 43A and 43B on the pipes 49 which lead to spray nozzles 4A and 4B can be opened or closed so that the spray of liquid 5 through each of arrays 4A and 4B can be enabled or shut down independently.

A single vertical panel 40A separates the spray nozzle arrays 4A and 4B. The point of support 48 of the panel 40A is below the height at which spray nozzle arrays 4A and 4B are mounted. Rotary panel 46, which rotates toward smoke inlet 3, is mounted so that the point of support 48 is its center.

With this embodiment, when the rotary panel 46 facing smoke inlet 3 rotates slightly downward from a horizontal orientation and is there held in place, the inlets to both left-hand gas channel 41A and right-hand gas channel 41B are opened to enable the normal mode of liquid-vapor contact.

When the rotary panel 46 is rotated downward from smoke inlet 3 toward liquid recovery vessel 56 until it hangs vertically, its bottom end becomes submerged in absorption liquid 5. This closes off the inlet to the left-hand channel 41A, leaving the exhaust gases entering through inlet 3 no alternative but to go through the right-hand channel 41B. Under these circumstances, when valve 43A for spray nozzle array 4A on the left side is closed, the volume of the channel through which the gas flows is reduced by one half.

Figure 10:
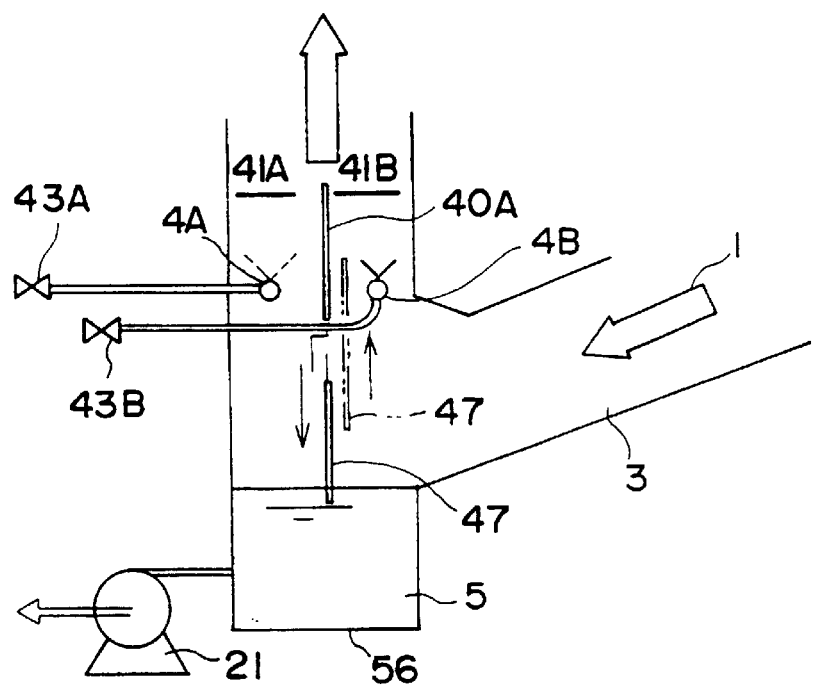
FIG. 10 shows a partial rough sketch of a wet gas processing apparatus which shows another type of panel shown in FIG. 7 according to the third modification.

FIG. 10 is another modification of the embodiment in FIG. 7. To explain only those aspects which differ from those of the modification in FIG. 9, the panel 40A is equipped with a sliding panel 47, which is installed below the height at which spray nozzle arrays 4A and 4B are mounted in such a way that it can freely move up and down. With this configuration, when the panel 47 is raised from recovery vessel 56, the inlets to both left-hand gas channel 41A and right-hand gas channel 41B are opened to enable the normal mode of liquid-vapor contact.

When the panel 47 is lowered vertically, its bottom end is submerged in absorption liquid 5. This closes off the inlet to left-hand channel 41A, with the result that the exhaust gases entering through inlet 3 have no alternative but to go through right-hand channel 41B.

Under these circumstances, when valve 43A for spray nozzle array 4A on the left side is closed, the volume of the channel through which the gas flows is reduced by one half.

It would also be possible for the panel 40A to be constructed so that it could move horizontally in the direction orthogonal to the flow of exhaust gases.

Figure 11:
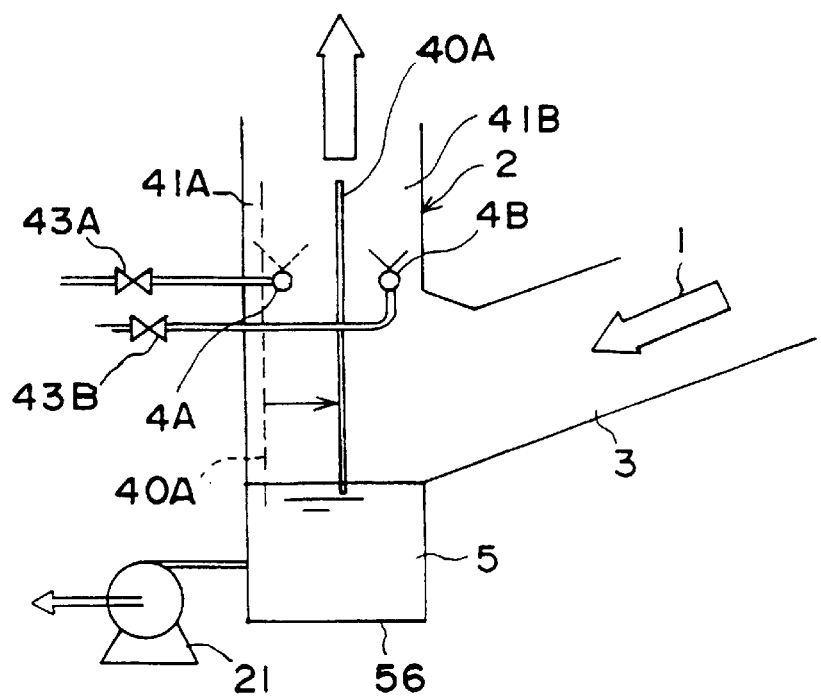
FIG. 11 shows a partial rough sketch of a wet gas processing apparatus which shows another type of panel shown in FIG. 7 according to the fourth modification.

FIG. 11 is another modification of movable panel 40A. The panel 40A moves from the left-hand wall of absorption tower 2 to the middle of the tower directly toward the flow of the exhaust gases. When it moves to the middle of the tower, panel 40A places itself between the left-hand spray nozzle array 4A and the right-hand array 4B, forming a vertical division.

The bottom end of the panel 40A is submerged in the absorption liquid 5 collected in recovery vessel 56.

As a result, only the inlet to channel 41B on the right side of the panel 40A is open. The right-hand channel 41B becomes narrower as panel 40A moves from the left-hand wall of absorption tower 2 to the middle of the tower, thus reducing the cross section of the channel through which exhaust gases 1 are conducted.

With this embodiment, panel 40A can be moved to the middle of the tower when the volume of flow of the exhaust gases decreases. In this way the volume of channels 41A and 41B can easily be reduced.

With this invention, then, when load fluctuation in the boiler or other combustion device causes the gas flow in the absorption tower to decrease so that the flow velocity of the gases negotiating the path decreases proportionally, the dimensions of the passage initially traversed by the gases can be controlled so that the flow velocity remains constant. The height of the spray from the spray nozzles can be kept constant, resulting in stable liquid-vapor contact between the absorption liquid and the gas flow, and enabling the absorption liquid to be recovered continually in the top of the tower.

This embodiment will also save the effort of driving the boiler pump to no purpose and prevent the liquid from being recycled uselessly.

By closing off one of the gas channels created by the panels or by reducing the cross section of the passage traveled by the gases, we can control the volume of the channel in response to a drop in the volume of flow so that the flow velocity of the gases remains constant.

Further, by adjusting the level of the liquid in the recovery vessel or selectively lowering the panel until its lower end is submerged, we can easily open or close off one or more of the channels.

With this embodiment, we can easily control the volume of gas flowing into the channels or the opening and closing of the inlets to the channels by changing the angle at which the bottom of the panel hangs.

In the apparatus in FIG. 8, the panel also functions to rectify the flow of the exhaust gases, resulting in more effective liquid-vapor contact.

In the apparatuses pictured in FIGS. 9 through 11, the panel is moved in response to a change in the volume of flow of the exhaust gases. This allows us to freely adjust the cross sectional area of the gas channel.

Figure 12:
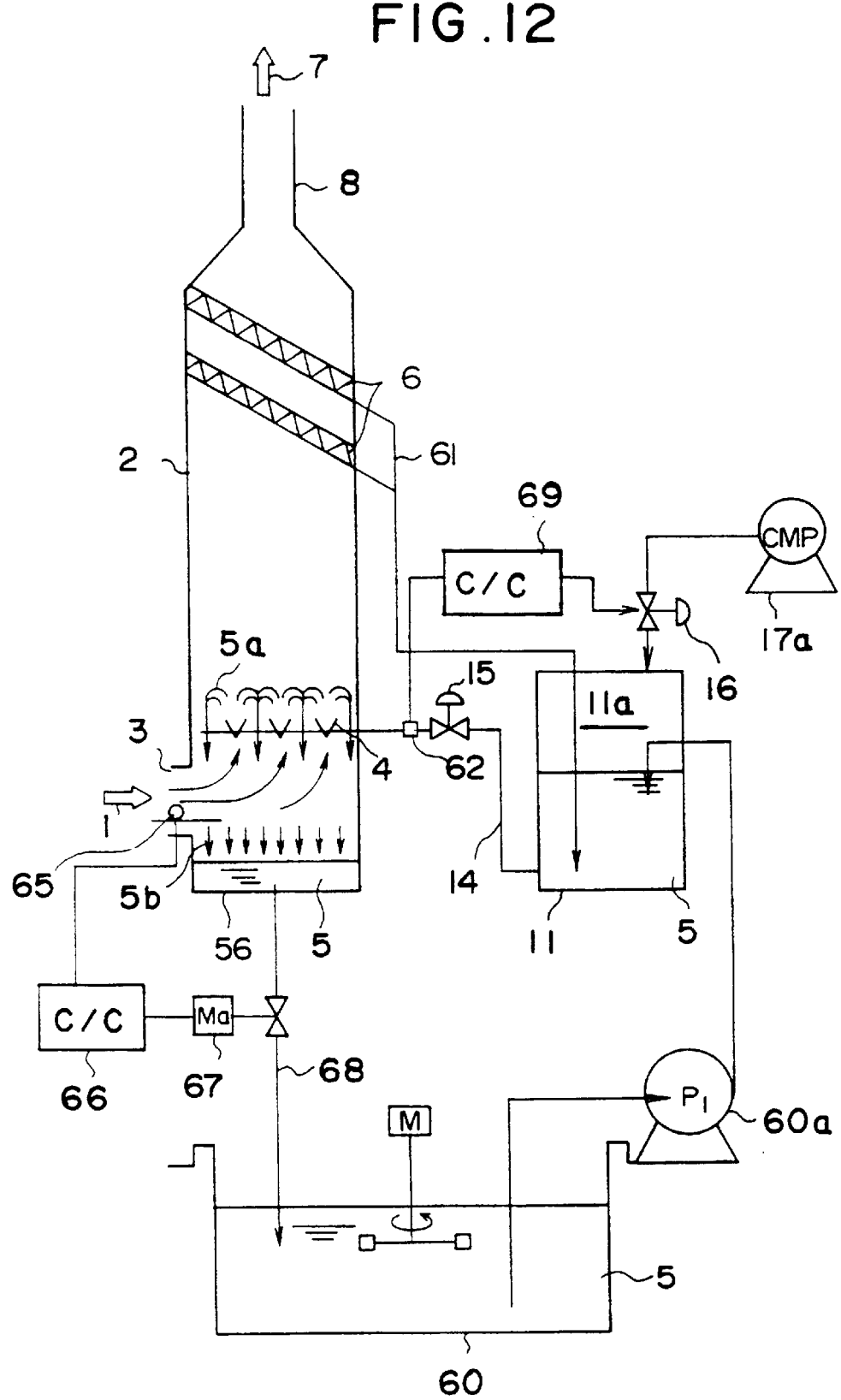
FIG. 12 is a rough sketch of a wet gas processing apparatus which is the fourth preferred embodiment of this invention.

FIG. 12 is a rough sketch of a wet gas processing apparatus which is the fourth preferred embodiment of this invention. We shall refrain from discussing the aspects of this apparatus which overlap those of devices which were explained previously.

As can be seen in FIG. 12, below recovery vessel 56, which is the tank at the bottom of absorption tower 2, are blowpit 60 and blowpit pump 60a, both of which are already furnished for maintenance purposes.

On pipe 68, which runs from recovery vessel 56 to blowpit 60, there is an electromagnetic valve 67. The flow velocity (in the tower) of the exhaust gases passing sensor 65 in smoke inlet 3 is detected by control circuit 66. When absorption tower 2 is being started up or shut down, electromagnetic valve 67 is opened until the flow velocity of exhaust gases 1 reaches the loading velocity. This creates a roundabout recirculation path consisting of recovery vessel 56, blowpit 60, blowpit pump 60a and pressure tank 11.

The space above the liquid stored in pressure tank 11, which is installed outside of absorption tower 2, can be pressurized as desired. The pressure is controlled by control circuit 69, using compressor 17a and pressure regulator 16.

Through pressure sensor 62, control circuit 69 detects the pressure at the inlet of supply pipe 14. Through pressure regulator 16, it controls the pressurization of space 11a above the liquid in tank 11 so as to keep the pressure of the liquid supplied to spray nozzles 4 most nearly constant.

When the liquid in tank 11 rises or falls, the pressure applied to space 11a above the liquid is controlled by pressure regulator 16 in response to changes in the gravitational force of the liquid 5. In this way the supply of liquid 5 can be kept constant regardless of the height of the liquid in the tank 11.

The outlet of pipe 61 which recirculates the absorption liquid 5 separated by mist eliminator 6 in the top of tower 2 is below the surface of the liquid in pressure tank 11. This results in a recirculation system (hereafter called the primary circulation system) consisting of pressure tank 11; supply pipe 14; spray nozzles 4; the entrainment process by which exhaust gases 1 are brought into contact with the liquid and their targeted components are absorbed; the separation of the liquid by mist eliminator 6; recirculation pipe 61; and back to pressure tank 11.

With this embodiment, when the velocity of the exhaust gases is equal to the loading velocity, which is 8 m/s, absorption liquid 5 will circulate through the primary circulation system so that the jets 5a of liquid 5 sprayed from spray nozzles 4 will be carried to mist eliminator 6 by exhaust gases 1.

That is to say, the velocity of jets 5a of liquid 5, which goes through supply pipe 14 and is sprayed out of spray nozzles 4, is controlled so that it is most nearly constant. This is accomplished by pressure regulator 16, which pressurizes tank 11 by controlling the pressurization of the space 11a above the liquid in the tank. The jets are made to rise to the top of absorption tower 2 and entrained to the rising exhaust gases to effect liquid-vapor contact. Through the process of contact, the targeted components of exhaust gases 1 are absorbed before the liquid reaches mist eliminator 6. The entrained liquid is separated by mist eliminator 6 and recirculated to pressure tank 11 via pipe 61.

Figure 13:
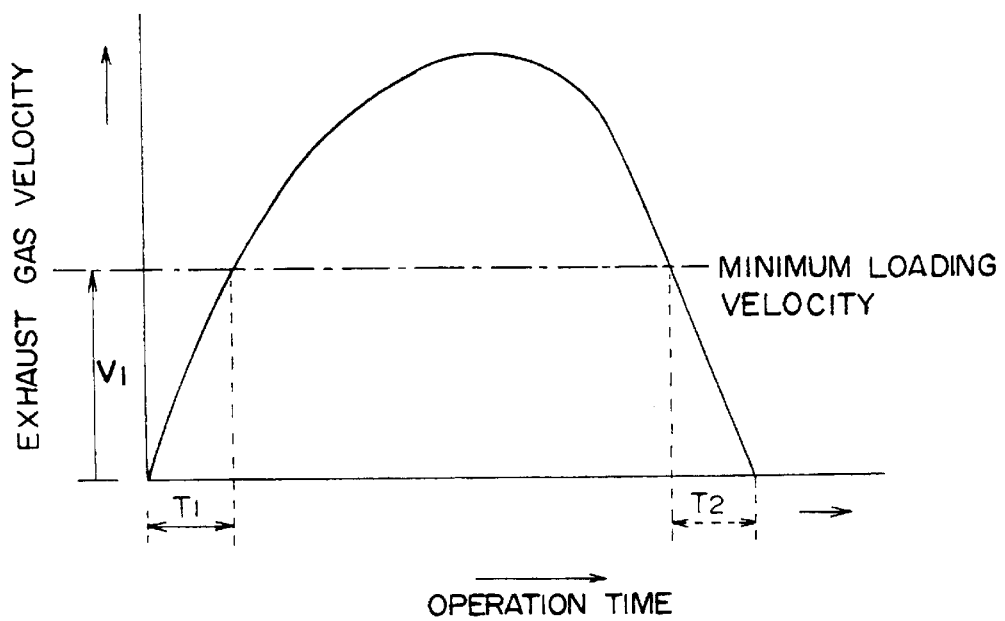
FIG. 13 shows a graph of volume of exhaust over time of boiler operation.

In FIG. 13, the vertical axis represents the exhaust gas velocity, the horizontal axis represents the operation time, and the horizontal broken line represents the minimum loading velocity. As can be seen in FIG. 13, when absorption tower 2 is being started up or shut down, the flow velocity of the exhaust gases is below the loading velocity. When this happens, the jets 5a of liquid 5 sprayed from spray nozzles 4 will not be carried by exhaust gases 1 to the top of the tower. Instead, virtually all the liquid 5 which is sprayed will fall into recovery vessel 56. (The falling liquid is labeled 5b in the drawing.)

At the same time, the velocity of the exhaust gases (the tower velocity) picked up by sensor 65 at inlet 3 is detected by control circuit 66, and electromagnetic valve 67 is opened until this velocity equals the loading velocity. The liquid in recovery vessel 56 then circulates to tank 11 by the path consisting of recovery vessel 56; blowpit 60; blowpit pump 60a; and pressure tank 11.

That is to say, the liquid 5b which falls into recovery vessel 56 is conducted into the existing blowpit 60 below recovery vessel 56. This eliminates the need for a much larger recovery vessel 56. The liquid routed into blowpit 60 can then be recirculated via blowpit pump 60a to pressure tank 11.

With the recirculation path described above, when the liquid in tank 11 rises or falls, control circuit 69 detects, via sensor 62, the pressure at the inlet of supply pipe 14 and, via pressure regulator 16, controls the pressure of the liquid supplied to spray nozzles 4 so that it remains most nearly constant. This allows the supply of absorption liquid 5 to remain constant regardless of the height of the liquid in the tank 11.

In this embodiment, space 11a above the liquid in pressure tank 11 can be pressurized by compressor 17a to a given pressure. There is thus no need for a recirculation pump to spray liquid 5 from spray nozzles 4. However, the end of pipe 61 must be placed below the surface of the liquid in pressure tank 11 to prevent air leaks.

With this embodiment, when the velocity of the exhaust gases drops because of a fluctuation in the load on the combustion device, a recirculation path can be used whereby the absorption liquid in the collection tank on the bottom of the tower goes through a second liquid storage tank on its way to the pressure tank. Preferably, the maintenance recirculation system can be used effectively to continuously circulate the liquid. Because the maintenance recirculation system uses the already existing blowpit and blowpit pump, there is no need to increase the size of the relevant holding tanks or use more drive power. This keeps operating and equipment costs low.

With this embodiment, the pressure at which the liquid is sprayed is controlled by adjusting the applied pressure obtained by pressurizing the tank. No spray pump is needed, and liquid can be supplied in a stable fashion without regard to the height of liquid in the tank.

As can be seen in FIG. 13, when absorption tower 2 is being started up or shut down, the flow velocity of the exhaust gases is below the loading velocity. When this happens, the jets 5a of liquid 5 sprayed from spray nozzles 4 will not be carried by exhaust gases 1 to the top of the tower. Instead, virtually all the liquid 5 which is sprayed will fall into recovery vessel 56. (The falling liquid is labeled 5b in the drawing.) To address this shortcoming, in prior art processing apparatuses the exhaust gases from the combustor or boiler were not fed through the absorption tower while it was being started up or shut down. At these times the exhaust bypassed the tower and was discharged into the smokestack. When the velocity of the exhaust gases reached the loading velocity, they would begin to be routed through the tower.

Figure 17:
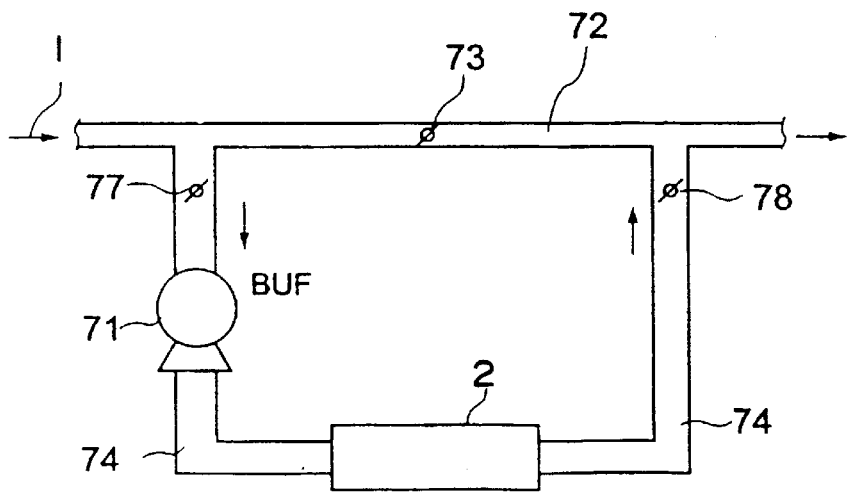
FIG. 17 shows a wet gas processing system of the prior art, which employs a wet absorption tower in the main path which links a source of exhaust gases and the atmosphere.

This rerouting system is illustrated in FIG. 17. On main path 74, which links the boiler, combustor or other source of exhaust gases with the smokestack or other device to release the gases into the atmosphere, the pressure of the exhaust gases 1 is boosted. On this path the gases go through booster fan 71, which accelerates them, and the wet gas absorption tower 2. Bypass 72 connects the inlet side of booster fan 71 and the discharge side of absorption tower 2. On the bypass is a damper 72 leading to the smokestack. When tower 2 is being started up or shut down, the booster fan 71 is turned off, damper 73 is opened and dampers 77 and 78 are closed. Then, instead of passing through the absorption tower 2, the exhaust gases 1 discharged by the combustor or boiler flow into bypass 72, detouring around the tower 2, and are discharged through the smokestack. When the velocity of the gases reaches the loading velocity needed to raise the liquid 5 to a standard level, the booster fan 71 is driven, damper 73 is closed and dampers 77 and 78 are opened. The bypass 72 is closed off, and exhaust gases 1 flow from the boiler along main path 74 as shown by the arrows. They pass through booster fan 71, undergo the specified desulfurization process in absorption tower 2, and are exhausted through the smokestack.

With this prior technology, then, the exhaust gases did not pass through the tower during start-up and shut-down of the tower. Since the gases were not processed at this time, the sulfur dioxide gas and particulate in them could not be removed. If this is addressed by burning light oil, which produces exhaust with less $SO_2$ and fewer particulate, the fuel cost becomes substantially higher.

FIG. 14 concerns the fifth preferred embodiment of this invention, which successfully employs a prior art bypass 72 to enhance the effect achieved by the fourth embodiment. On main path 74, which links the boiler, combustor, or other source of exhaust gases with the smokestack or other means by which the gases are discharged to the atmosphere, there is a processing system in which the made to flow through absorption tower 2, where their velocity is used to entrain absorption liquid 5. The resulting liquid-vapor contact causes the targeted components of the gases to be absorbed by liquid 5. (A) shows which dampers are open and shut and which way the gases flow when the tower is started up. (B) shows the dampers and the gas flow when the exhaust gases from the boiler which are led into the tower have reached loading velocity.

As can be seen in FIG. 14, on main path 74, which links the boiler, combustor or other source of exhaust gases with the smokestack or other device to release the gases into the atmosphere, the exhaust gases 1 from the boiler go through booster fan 71, which boosts their pressure and accelerates them, and the wet gas absorption tower 2. Bypass 72 connects the inlet side of booster fan 71 and the discharge side of absorption tower 2. On it there is a damper 73 on the way to the smokestack.

Figure 14A:
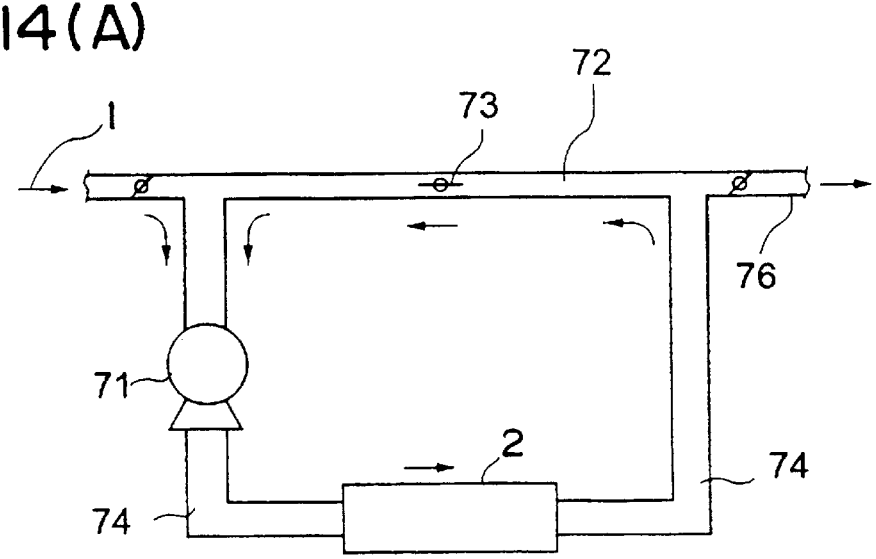
FIG. 14 shows a wet gas processing system which is the fifth preferred embodiment of this invention, which employs a wet absorption tower in the main path which links a source of exhaust gases and the atmosphere. (A) shows which dampers are open and shut and which way the gases flow when the tower is started up. (B) shows the dampers and the gas flow when the exhaust gases from the boiler which are led into the tower have reached loading velocity.

In this embodiment, at start-up, before the exhaust gases are conducted to absorption tower 2, damper 73 is opened as shown in FIG. 14(A), forming a recirculation path to boost the pressure of the gases which comprises both bypass 72 and main path 74. Instead of following exhaust path 76, the gases 1 from the boiler are accelerated by booster 71 on the recirculation path. This continues until the gases in tower 2 reach loading velocity.

Figure 14B:
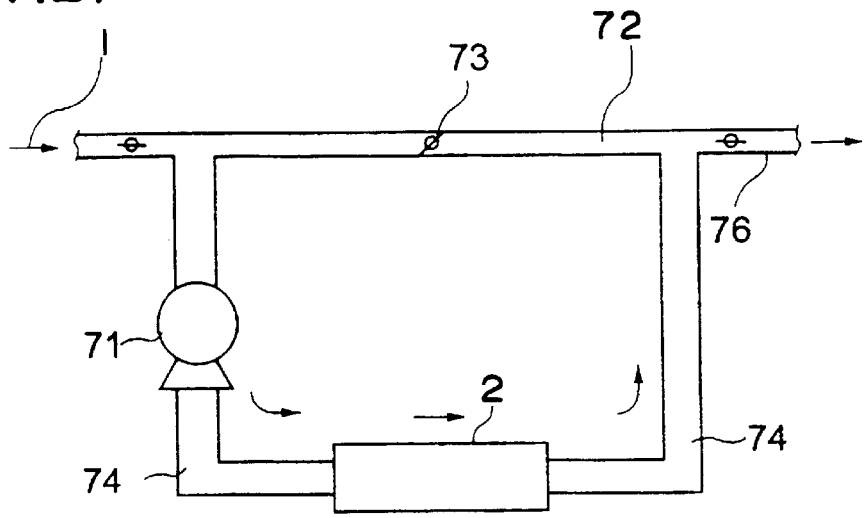

When the gases in the tower can maintain loading velocity, damper 73 on bypass 72 is closed, as can be seen in FIG. 14(B), and exhaust gases 1 are processed without being recirculated.

The use of the bypass to boost the pressure of the gases will be explained shortly with reference to the graph of volume of exhaust over time of boiler operation in FIG. 13.

As can be seen in the graph in FIG. 13, during startup period $T_1$, just after the tower has been put into operation, and shut-down period $T_2$, just before the tower is taken out of operation, the volume of exhaust gases is so low that their velocity in absorption tower 2, where they are processed, is below the velocity $V_1$ at which the liquid no longer falls into the collection tank (i.e., the loading velocity). Damper 73 is opened, as shown in FIG. 14(A), until the gases in the tower reach their loading velocity. Once they have reached this velocity, damper 73 is closed, as shown in FIG. 14(B), and the operation of tower 2 is fully functional.

Figure 15:
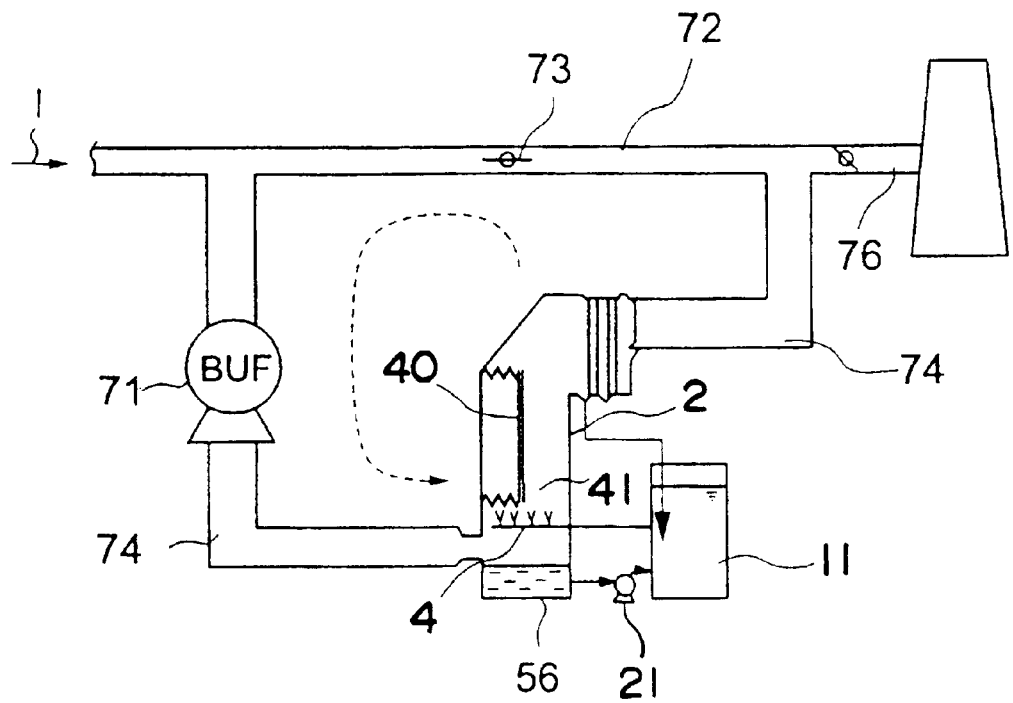
FIG. 15 shows a wet gas processing system according to an another modification of the fifth embodiment shown in FIG. 14, in which panels are provided to control the width of the channel in absorption tower.

FIG. 15 shows an another modification of the fifth embodiment, in which panels are provided to control the width of the channel in absorption tower 2 through which the exhaust gases flow. A vertical panel 40 is provided in liquid-vapor contact zone 41. The panel 40 can move horizontally to change the cross sectional area of the passage traversed by the exhaust gases in contact zone 41.

Figure 16:
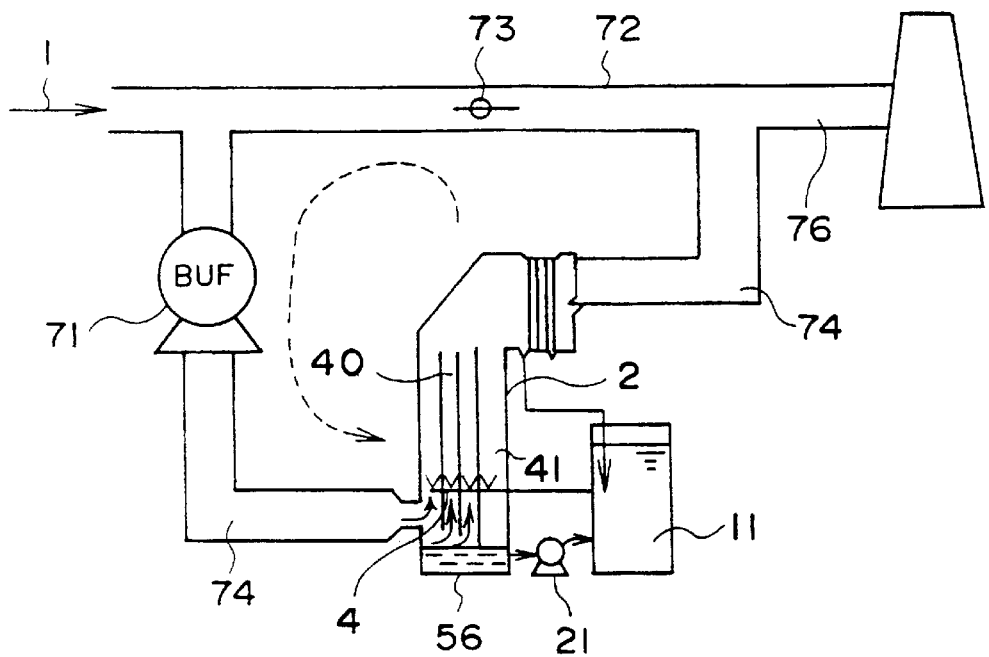
FIG. 16 shows a wet gas processing system according to yet another modification of the fifth embodiment shown in FIG. 14, in which panels are provided to control the width of the channel in absorption tower.

FIG. 16 is yet another modification of the fifth preferred embodiment of this invention. It corresponds to FIG. 7, in which a number of panels control the width of the gas channel in absorption tower 2. Several panels are oriented vertically in liquid-vapor contact zone 41 with their bottom ends at different heights, step-fashion. By controlling the height of the liquid on the bottom of the tower, we can change the cross sectional area of the passage for the exhaust gases.

When the exhaust gases 1 conducted into the absorption tower 2 are flowing at a speed below the loading velocity of the tower, the panels 40 can be used to constrict the passage for the gases in tower 2. If damper 73 is opened, routing the processed gases into bypass 72, they will be returned by way of booster fan 71 to the inlet to tower 2. In this way the in-tower velocity of the exhaust gases 1 conducted into the absorption tower 2 can be boosted even more.

With this embodiment, then, the flow velocity of the gases in the tower can be maintained consistently above the loading velocity. This means that the absorption tower can be operated at full capacity even while the plant is being started up or shut down and that there is no need for a larger capacity liquid storage tank on the bottom of the tower or a recirculation pump.

Figure 18:
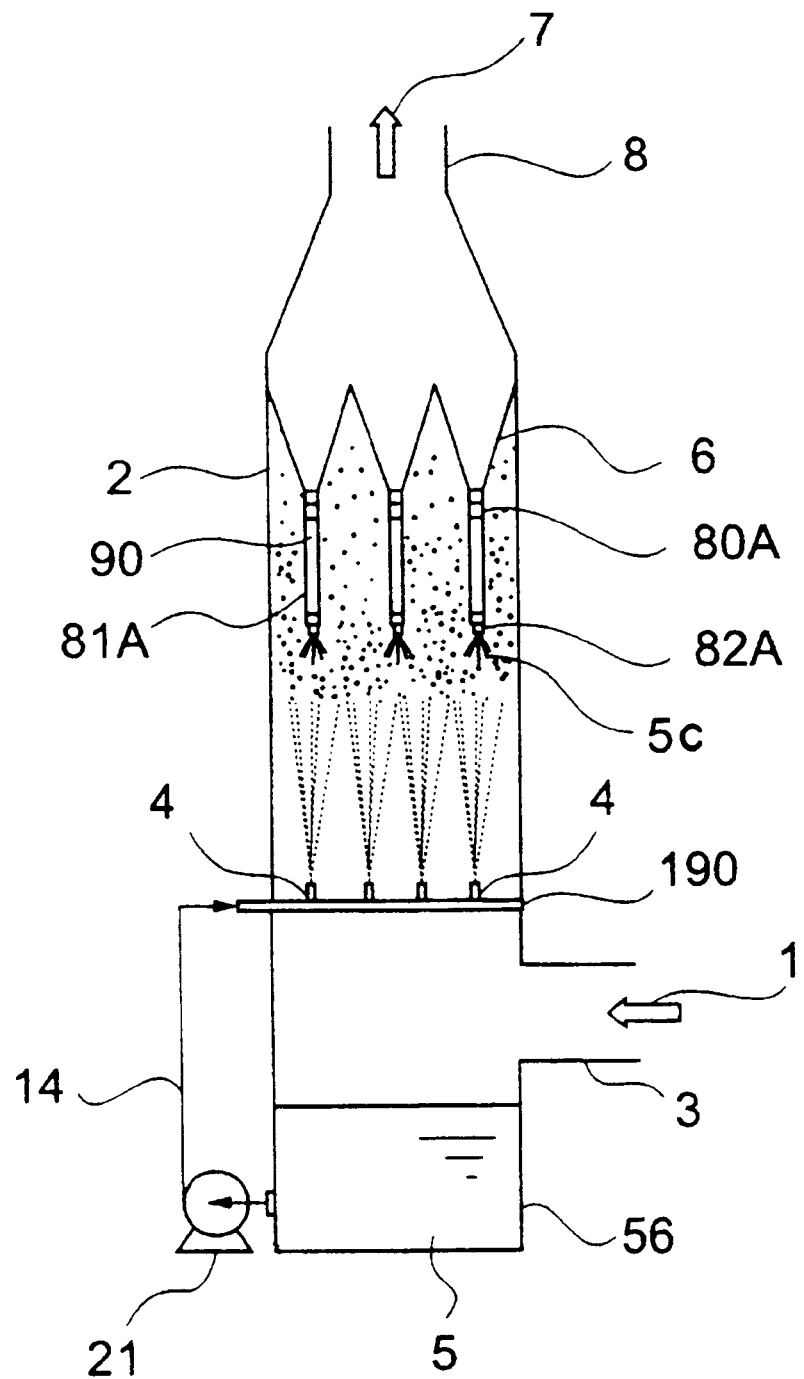
FIG. 18 is a rough sketch of a wet gas processing apparatus which is the sixth preferred embodiment of this invention.
Figure 19:
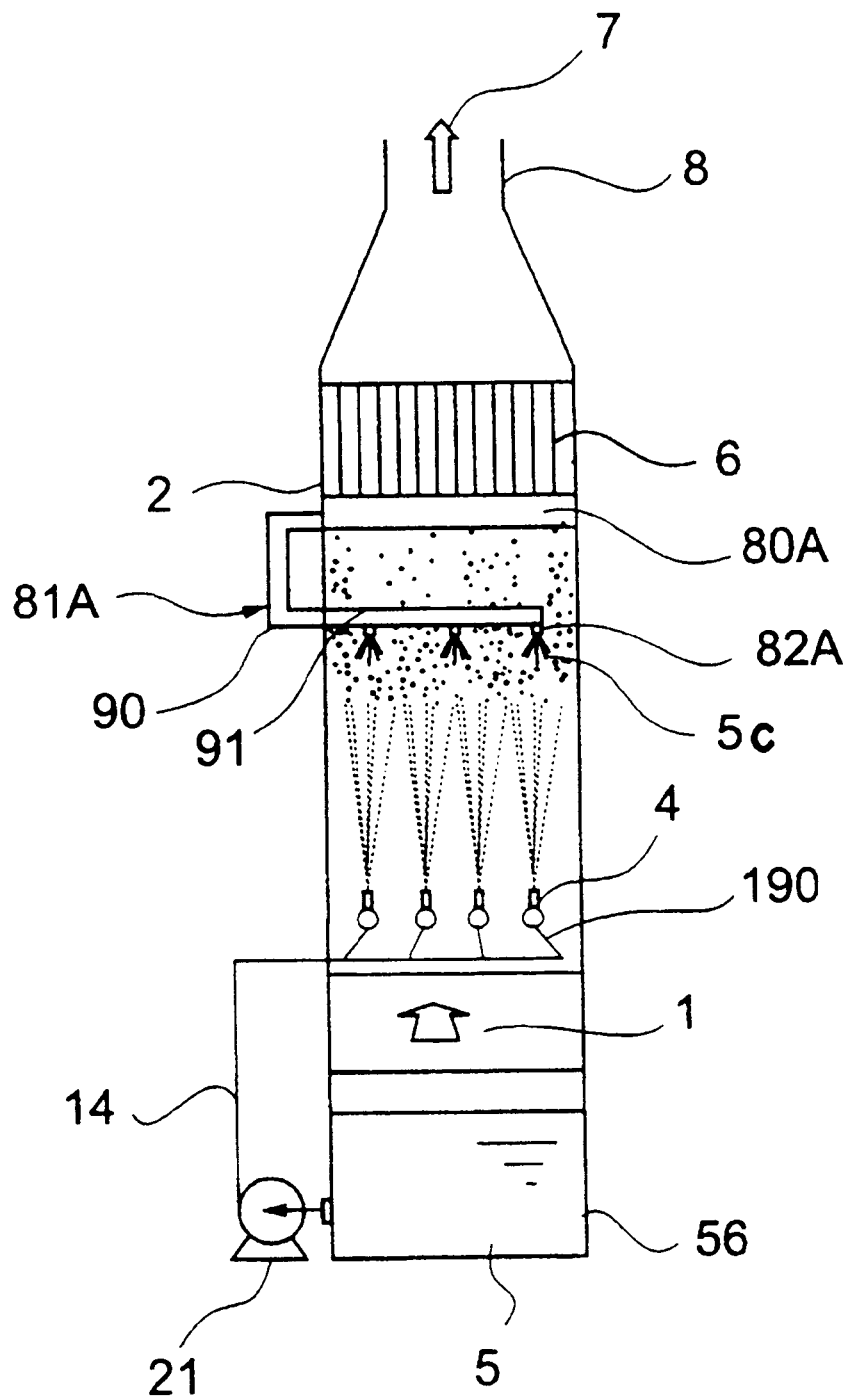
FIG. 19 show the side view of FIG. 18.

FIGS. 18 and 19 are front and side views of a wet gas processing apparatus which is the sixth preferred embodiment of this invention. We shall refrain from discussing those aspects of the drawings which are identical to features of previously treated embodiments. At mid-level with respect to the height of tower 2 are a given number of head pipes 190 with multiple upward-facing spray nozzles 4. Supply pipe 14, which has a recirculation pump 21 on it, runs between these head pipes 190 and the recovery vessel 56. Through these components, the absorption liquid 5 is dispersed in absorption tower 2. The targeted components of the exhaust gases, sulfur dioxide and particulate, are absorbed and removed as described above.

Mist eliminator 6 is placed in the top of absorption tower 2 below smoke outlet 8.

Figure 20:
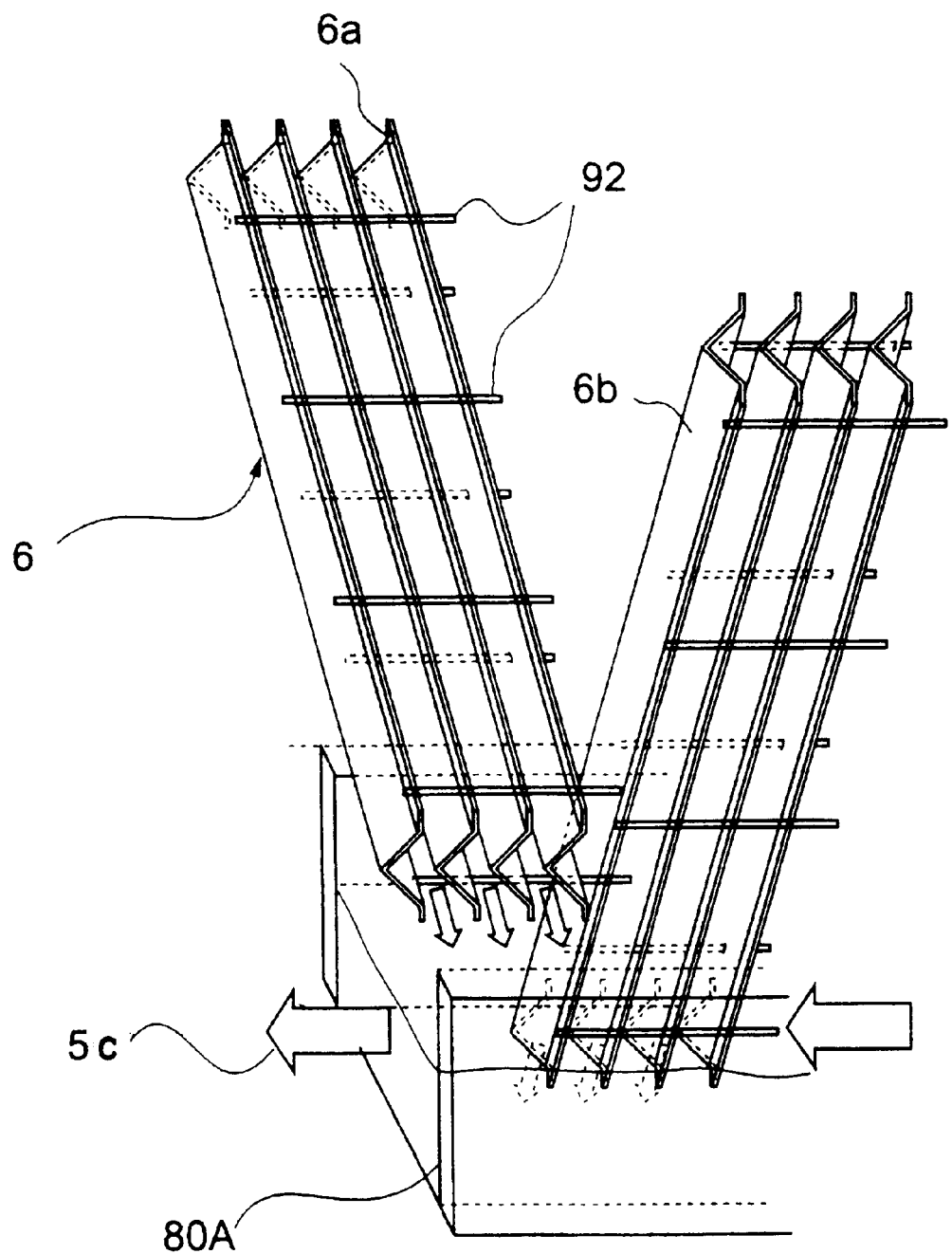
FIG. 20 show an enlarged perspective view of a mist eliminator which might be installed the apparatus shown in FIG. 18.

A preferred example of a mist eliminator 6 which might be installed here is shown in FIG. 20. This mist eliminator comprises a number of panels 6a with a lateral cross section resembling a mountaintop (or a flattened letter V). These panels are placed one on top of another with spaces between and held together by bars 92. The row of panels 6a is attached at its bottom to a second row of panels 6b, with one row slanting to the left and the other to the right. In this configuration the panels are mounted to absorption tower 2. However, the form and arrangement of mist eliminator 6 are not limited to the example shown in FIG. 20. As will be discussed shortly, the two sets of panels 6a and 6b should be canted toward each other so that they can be fastened together at the bottom, and receptacle 80A should be oriented crosswise to the axes of panels 6a and 6b in order to minimize the number of receptacles 80A which are needed to collect the liquid 5 which falls from mist eliminator 6. In any case, there must be sufficient space for the entrained flow to pass through in order for the mist of absorption liquid 5 entrained to exhaust gases 1 to be effectively captured by mist eliminator 6.

We shall next discuss the basic configuration of the invention. Below the mist eliminator 6 the desired number of receptacles 80A, which are collection tanks (See FIG. 20) to receive the absorption liquid 5 that falls from mist eliminator 6. In this embodiment there are three receptacles 80A; but as many can be provided as are appropriate for the arrangement and number of mist eliminators 6.

These receptacles 80A are connected to the upper end of pipe 81A. The pipe 81A has a vertical segment 90 which extends downward for a specified length. The vertical segment 90 provides the absorption liquid 5c which is being transported with potential energy (i.e., gravitational energy). The segment extends to directly below the collection zone for the dispersed absorption liquid. On its bottom end is nozzle-shaped opening 82A.

The length of vertical segment 90 of the pipe 81A will differ according to the height of the columns of liquid sprayed upward by spray nozzles 4, but it should be at least the same length as the height of mist eliminator 6 or longer.

The actual configuration of the receptacles 80A and pipe 81A will be explained in detail with reference to FIG. 19. Each receptacle 80A, which is placed where the bottoms of the two sets of panels 6*a* and 6*b* are fastened together, is oriented orthogonal to the line along which the bottoms of the mist eliminators are fastened together and horizontally with respect to the tower. The bottom of each receptacle 80A is inclined slightly so that absorption liquid 5*c* will flow in a single direction.

The upper end of pipe 81*a* is connected to the side wall of absorption tower 2 at the lower end of the slanted bottom of the receptacle 80A so that the liquid in receptacle 80A will flow into it.

The pipe 81A has the form of an angular letter "C". Its vertical segment 90 extends downward along the exterior wall of the tower for a distance equal to the height of mist eliminator 6. At the end of segment 90 the pipe bends and reenters the tower horizontally. On the undersurface of horizontal segment 91, which is again inside the tower, a number of nozzle-shaped openings 82A are provided at specified intervals. More specifically, nozzle-like apertures 82A are above upward-facing spray nozzles 4, virtually at the apices of the columns of spray, and below the collection zone which is directly under mist eliminator 6. Using the potential energy it gains by flowing down pipe segment 90 (i.e., using the force of gravity), the liquid 5*c* which comes through the openings 82A is atomized as it collides with the columns of spray and becomes minute droplets. This provides more effective liquid-vapor contact.

In this embodiment, the vertical length of pipe 81A is chosen so that the horizontal segment of the pipe can be above the tops of the columns of spray coming out of spray nozzles 4 and away from and lower than the area directly below mist eliminator 6, where a collection zone for the dispersed liquid is likely to be generated.

As is seen in FIG. 19, a segment of pipe 81A may be outside absorption tower 2; or the entire pipe, including segment 90, may remain inside the tower.

We shall now discuss another preferred embodiment of this invention, which is shown in FIG. 21.

We shall only treat of aspects of the configuration which differ from those of the embodiment in FIG. 19, which was discussed above. All components or locations in FIG. 21 which are labeled with numbers which appear in FIGS. 18 through 20 have the same function as in those drawings. In the interest of avoiding duplication, we shall not discuss them further here.

In the second embodiment, just as in FIG. 18, a receptacle 80B is provided at the bottom of each pair of mist eliminators 6 where they come together. All of the receptacles 80B are joined by a single pipe 80, into which all the liquid flows. The pipe 80 is connected to the upper end of pipe 81B, which runs downward from pipe 80.

The pipe 81B runs down through tower 2. Its lower end, 82B, empties into liquid recovery vessel 56. Rather than being a spray nozzle, as in the previous embodiments, the opening 82B is a simple aperture.

In this embodiment, then, unlike in the apparatuses in FIGS. 18 and 19, the liquid collected in receptacles 80B is not atomized just above the columns of spray, but instead conveyed to recovery vessel 56.

We shall next discuss collectively the operation of the embodiments in the FIGS. 18 through 21.

When the exhaust gases 1 travelling upward through absorption tower 2 in the apparatuses of these embodiments reach a velocity of 5.5 m/s, the drops of liquid entrained to gases 1 begin to adhere to mist eliminator 6, and a large quantity of absorption liquid 5 begins to flow down the panels toward the bottom of the mist eliminator. Rather than being allowed to fall directly into the tower from mist eliminator 6, this absorption liquid 5 is collected in receptacles 80A and 80B. Gravity causes the liquid 5*c* from the receptacles 80A and 80B to flow into pipes 81A and 81B. In the embodiments shown in FIGS. 18 and 19, potential energy is used to spray this liquid from nozzle-like openings 82*a* onto the tops of the Jets (the absorption liquid) from spray nozzles 4. These openings 82*a* are not immediately below mist eliminator 6, but at a distance from it which is defined by the length of the pipes 81A. The liquid 5*c* sprayed from the openings 82A collides with the jets and reshapes itself into minute droplets. This enhances the effectiveness of the liquid-vapor contact.

In FIG. 21, the liquid which collects in receptacles 80B is conveyed to recovery vessel 56 and again sprayed up via head pipes 190 and spray nozzles 4.

All of the embodiments, then, avoid the problem of a large quantity of drops forming in the region immediately below mist eliminator 6, where a collection zone is likely to occur. Instead, the absorption liquid 5 is entrained on the exhaust gases 1 in this region so that it cannot be redispersed.

FIG. 22 is an experimentally verified logarithmic graph of the relationship between the velocity of the gases in the tower (represented by the horizontal axis (m/s)) and the concentration of the mist at the outlet of the mist eliminator (represented by the vertical axis (mg/m3N)). The graph compares a apparatus with a means of removing the absorption liquid (the apparatus of this invention) indicated by the black solid marks to a apparatus without such a means (a prior art apparatus) by the white empty marks.

The prior art apparatus indicated by an empty white circle produced jets which were 1.7 m high. When the gases in the tower reached a velocity of 5.5 m/s, the concentration at the mist outlet sharply increased. However, with the apparatus indicated by black solid circles, which produced jets to a height of 1.8 m, the concentration at the mist outlet did not increase even when the velocity exceeded 5.8 m/s.

When we compare the prior art apparatus indicated by empty white triangles, which produced a jet 3.5 m in height, with the apparatus of this invention, indicated by solid black triangles, which produced a jet 3.3 m high, we find that at the point in time where the velocity reaches 5.8 m/s, the apparatus of this invention produces a concentration of mist at the outlet which is less than 1/50 that of the prior art apparatus. This is a significant drop.

From this graph it is clear that when the velocity of the gases is over 5.5 m/s, the apparatus of this invention is much more effective at preventing mist from being released into the tower than the prior art apparatus.

The apparatus chosen to represent this invention in this experiment was that shown in FIG. 21. The other conditions were as follows. (For the height of the jets in the drawing, we used the height of the spray jet which remained in the shape of a column.)

Mist eliminator: Bent-panel type, with panels canted at 45°

Distance from mist eliminator to spray nozzles: 8 m

Figure 23:
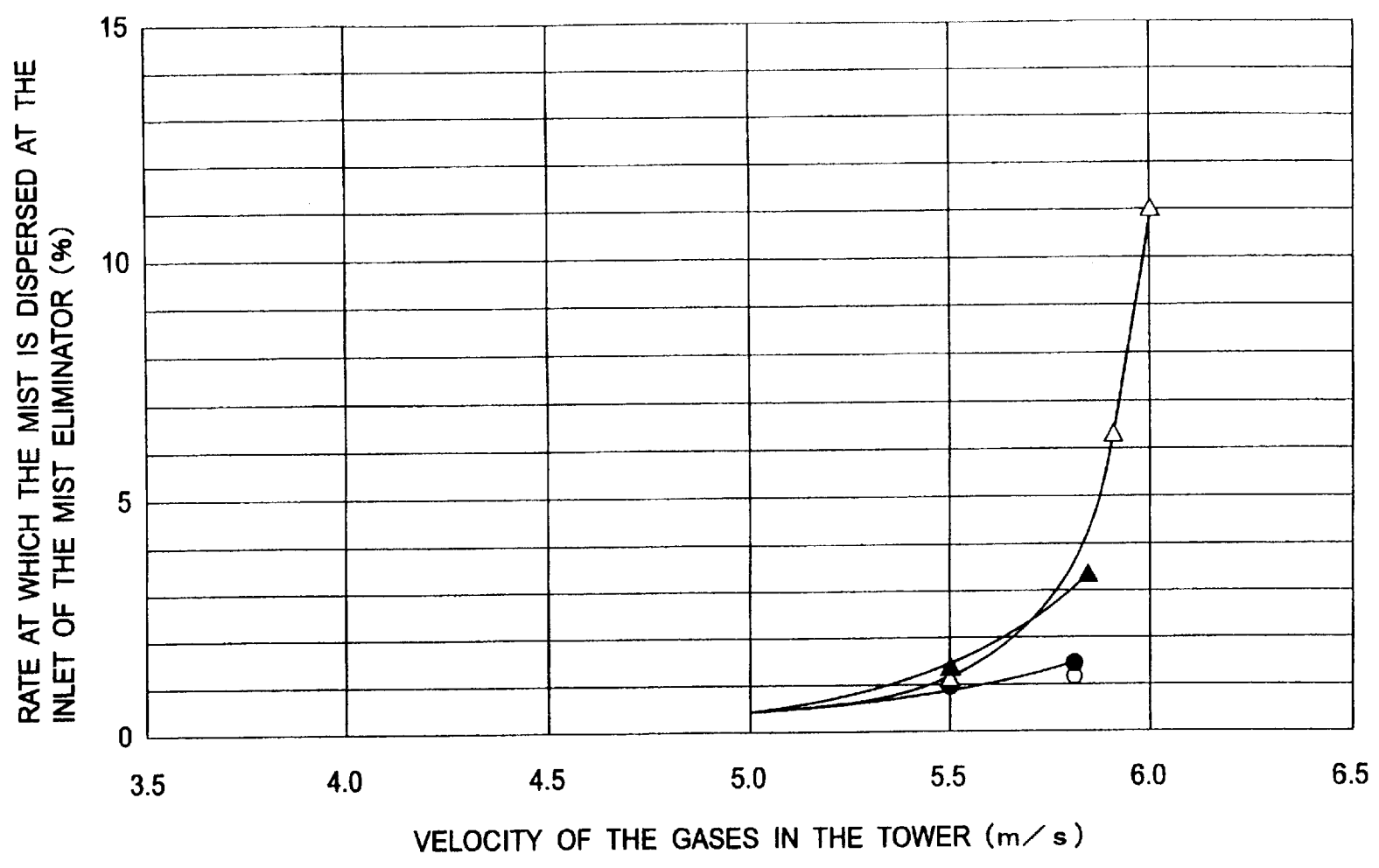

FIG. 23 is a graph of the experimentally verified relationship between the velocity of the gases (represented by the horizontal axis) in the tower and the rate at which the mist is dispersed at the inlet of the mist eliminator (represented by the vertical axis). The dispersion rate at the inlet of the mist eliminator of this invention (weight of mist/total weight of liquid sprayed×100) is not very different from that of the prior art apparatus indicated by empty circles, which produces a jet 2.4 meters in height, or the apparatus indicated by solid black circles, which produces a jet 1.9 meters in height. All three show a low dispersion rate. However, the prior art apparatus indicated by empty triangles, which produces a jet 2.8 meters high, and the apparatus indicated by solid black triangles, which produces a jet 3.3 meters high, have much higher dispersion rates than the present invention. The graph shows clearly that this invention has an acceptably low rate of mist dispersion even when the height of the jets is 3.3 meters and the gases are flowing at a velocity of 5.5 meters per second.

Figure 21:
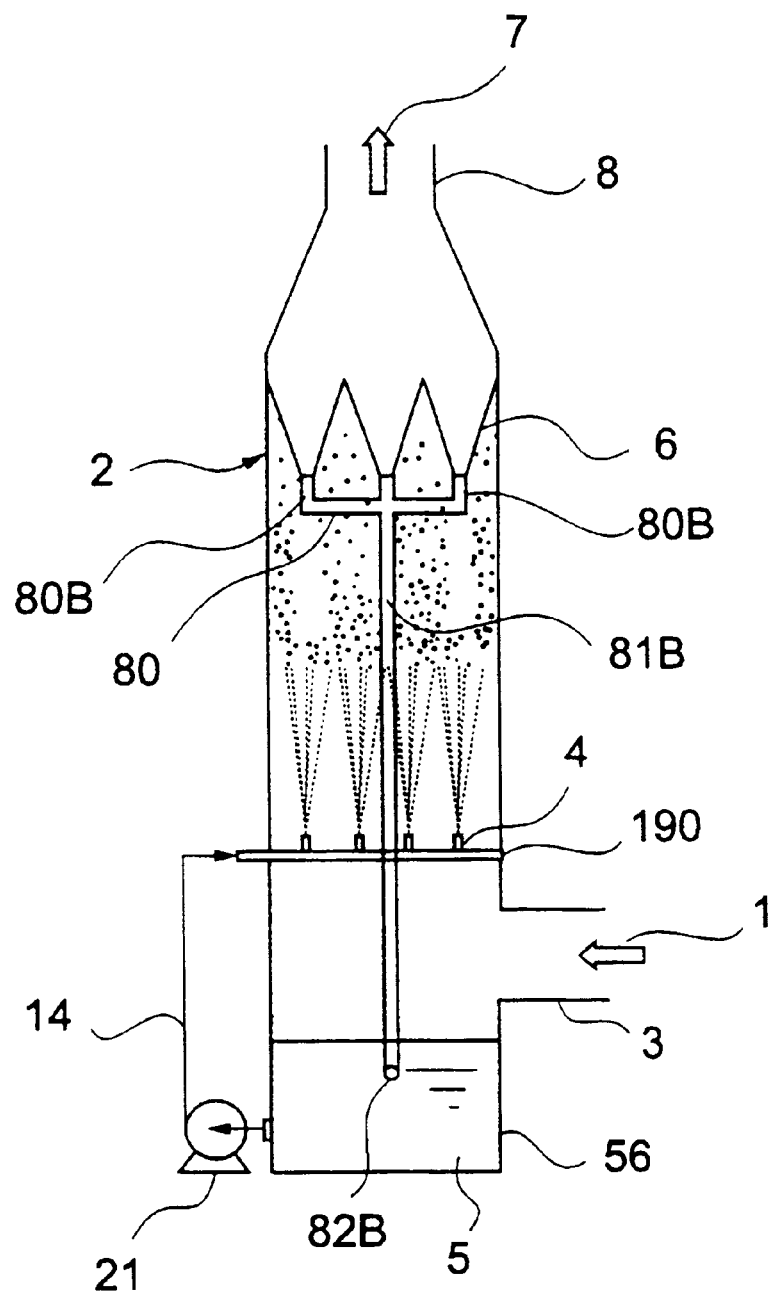
FIG. 21 shows a wet gas processing system according to an another modification of the invention shown in FIG. 18.
Figure 22:
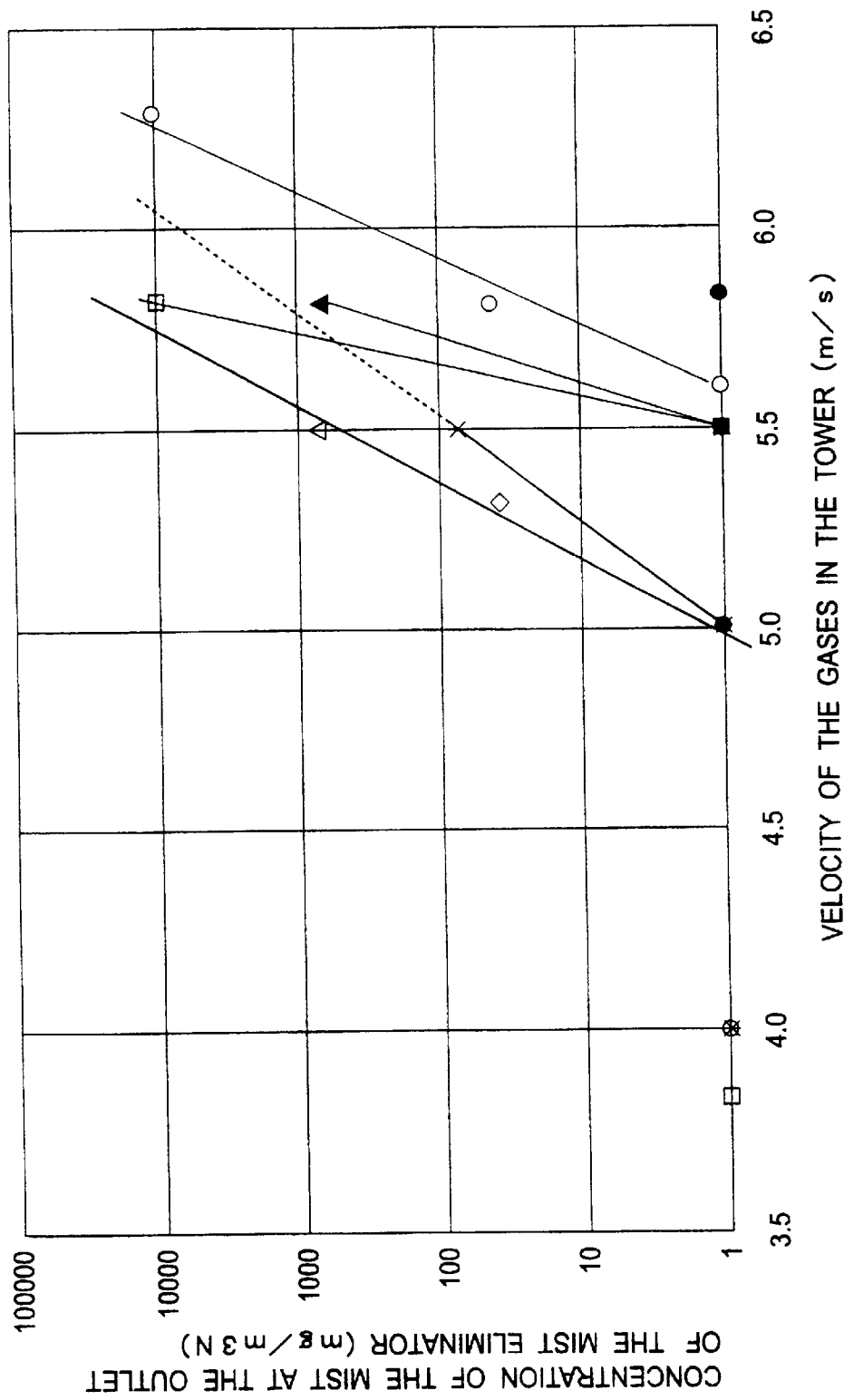
FIG. 22 is an experimentally verified logarithmic graph of the relationship between the velocity of the gases in the tower and the concentration of the mist at the outlet of the mist eliminator.
Figure 24A:
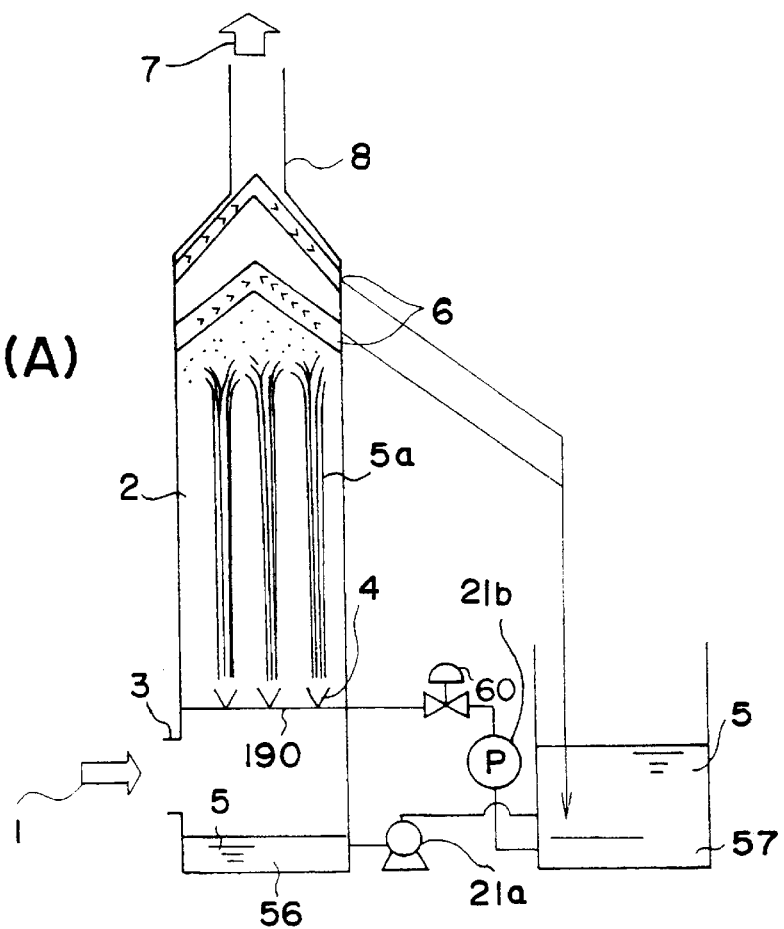
FIG. 24(A) shows a rough sketch of a conventional wet gas processing apparatus.
Figure 24B:
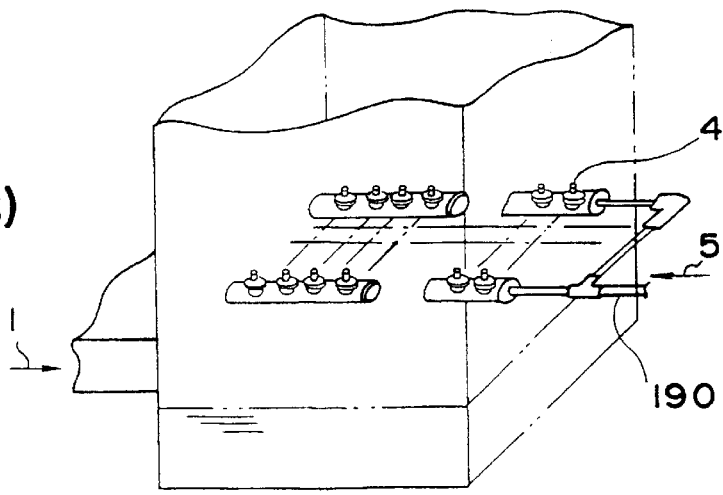
FIG. 24(B) shows a perspective view showing how numerous upward-facing spray nozzles and pipes of (A) are arranged.

The apparatus used in this experiment was that shown in FIG. 21. The other conditions were as follows. (For the height of the jets in the drawing, we used the height of the spray which remained in the shape of a column.)

Mist eliminator: Bent-panel type, with panels canted at 45°

Distance from mist eliminator to spray nozzles: 8 m

With this embodiment, then, only a very small volume of the mist entrained to the scrubbed exhaust gases and exhausted from the tower is collected. Accelerating the exhaust gases which flow through the tower improves the efficiency of the processing operation, so it is extremely beneficial.

With the embodiments shown in FIGS. 18 and 19, the absorption liquid returned via a pipe to the absorption units directly over the jets again undergoes the absorption process with respect to the exhaust gases along with the jets of liquid sprayed from the spray nozzles. This enhances the effect discussed above and so raises the processing function to a higher level.

With the embodiment pictured in FIG. 21, even when the volume of liquid reaching the mist eliminator vastly increases, the liquid is continuously transported to the collection tank and reused.

What is claimed is:

1. A wet gas processing apparatus in which an absorption liquid collected in a first liquid storage tank is sprayed in a specified direction by a set of spray nozzles in an absorption tower, and said sprayed absorption liquid is brought into contact with exhaust gases conducted into said absorption tower, and targeted components in said exhaust gases are absorbed and removed;

wherein said first liquid storage tank for said absorption liquid comprises a pressure tank which contains a pressurized gas in the space above the surface of said collected absorption liquid, and the pressure of said pressurized gas is employed to spray said absorption liquid collected in said pressurized tank from a set of spray nozzles in said absorption tower.

2. A wet gas processing apparatus according to claim 1;

wherein said targeted components for absorption and removal into said absorption liquid is sulfur dioxide ($SO_2$), and said pressurized gas is oxygen containing gas, and said oxygen containing gas is blown into said the collected absorption liquid at the bottom of said first liquid storage tank.

3. A wet gas processing apparatus in which an absorption liquid collected in a first liquid storage tank is sprayed in an upward direction by a set of spray nozzles in an absorption tower, and said sprayed absorption liquid is brought into contact with exhaust gases conducted into said absorption tower, and targeted components in said exhaust gases are absorbed and removed;

wherein said first liquid storage tank for said absorption liquid comprises a pressure tank which contains a pressurized gas in the space above the surface of said collected absorption liquid, and the pressure of said pressurized gas is employed to spray said absorption liquid collected in said pressurized tank from a set of spray nozzles in said absorption tower, and a collection unit to collect said sprayed absorption liquid which absorbed said targeted components is placed higher in said absorption tower than said surface of said collected absorption liquid, and an outlet of a pipe through which said absorption liquid is transported from said collection unit to said pressure tank is placed below said surface of said absorption liquid collected in said pressure tank.

4. A wet gas processing apparatus in which an absorption liquid collected in a first liquid storage tank is conducted to an absorption tower, and brought into contact with a flow of exhaust gases while being entrained at the flow velocity of said exhaust gases as said exhaust gases travel along exhaust gas paths in said tower, and targeted components in said exhaust gases are absorbed and removed, comprising;

a plurality of overflow ports provided at the wall of a plurality of absorption pipes arranged crossing to said gas paths from which said absorption liquid overflows and gushes in parallel orthogonal;

wherein said absorption liquid overflowed and gushed contacts with said flow of exhaust gases orthogonally, and said flow of exhaust gases breaks said absorption liquid overflowed and gushed into small drops and effects liquid-vapor contact.

5. A wet gas processing apparatus according to claim 4, wherein a plurality of said overflow ports are arranged in row parallel orthogonal to said exhaust gas paths to form one or more arrayed stages including staggered stages to make orthogonal contact with said flow of exhaust gases, and said flow of exhaust gases is brought into the spaces neighboring pipe arrays which results in both atomization of said absorption liquid and liquid-vapor contact.

6. A wet gas processing apparatus according to claim 4, wherein the tops of said absorption pipes are open, and said over flow ports are provided in a virtually horizontal direction, orthogonal to the direction in which said exhaust gases are propelled.

7. A wet gas processing apparatus according to claim 4, wherein the tops of said absorption pipes are close, and a plurality of slits or rows of small holes are provided along said pipes in the axial direction, on the peripheral surfaces of the pipes facing the spaces where said exhaust gases are introduced.

8. A wet gas processing apparatus according to claim 4, wherein said absorption liquid is provided to said plurality of absorption pipes from said first liquid storage tank using the force of gravity.

9. A wet gas processing method in which absorption liquid collected in a first liquid storage tank is sprayed in an upward direction by a set of spray nozzles in an absorption tower, and said sprayed absorption liquid is brought into contact with exhaust gases conducted into said absorption tower, and targeted components in said exhaust gases are absorbed and removed, comprising:

a controlling step of controlling a width of a said exhaust gas paths in proportion to the volume of said exhaust gases supplied, thereby control the gas channels for said exhaust gases to flow into said absorption tower.

10. A wet gas processing method according to claim 9, wherein said spray nozzles in said gas channel which is obstructed are closed and prevent said absorption liquid from being sprayed.

11. A wet gas processing apparatus in which absorption liquid collected in a first liquid storage tank is sprayed in an upward direction by a set of spray nozzles in an absorption tower, and said sprayed absorption liquid is brought into contact with exhaust gases conducted into said absorption tower, and targeted components in said exhaust gases are absorbed and removed, comprising:

a flow control means to control a volume of said exhaust gases entering to a plurality of gas channels in proportion to the exhaust gas volume by dividing an exhaust gas path into a plurality of exhaust gas paths by a plurality of vertical panels which extend to the region of said spray nozzles.

12. A wet gas processing apparatus with a recovery vessel provided at the bottom of said the absorption tower and a spray nozzle provided in upper inside space of said absorption tower from which said absorption liquid is sprayed upward according to claim 11;

wherein a lower edge of at least one of said vertical panels extending along said exhaust gas path to the region of said spray nozzles further extends down as far as a recovery vessel where said absorption liquid is recovered, and said exhaust gas paths segmented by said vertical panels is selectively opened or closed by adjusting the level of said absorption liquid in said recovery vessel, thereby said lower edge of at least one of said vertical panels is immersed in said absorption liquid.

13. A wet gas processing apparatus with a recovery vessel provided at the bottom of said the absorption tower and a spray nozzle provided in upper inside space of said absorption tower from which said absorption liquid is sprayed upward according to claim 11;

wherein a lower edge of at least one of said vertical panels extending along said exhaust gas path to the region of said spray nozzles is free to ascend from or descend to said recovery vessel where said absorption liquid is recovered, and said exhaust gas paths segmented by said vertical panels is selectively opened or closed by adjusting the level of said vertical panels, thereby said lower edge of at least one of said vertical panels is selectively immersed in said absorption liquid.

14. A wet gas processing apparatus according to claim 11, wherein a lower portion of at least one of said plurality of said vertical panels extending along said exhaust gas path to the region of said spray nozzles is free to swing to alter the angle of said vertical panels, thereby the volume of said exhaust gases entering said exhaust gas path is controlled.

15. A wet gas processing apparatus according to claim 11, wherein a lower portion of at least one of said plurality of said vertical panels extending along said exhaust gas path to the region of said spray nozzles is free to swing to the inlet side of said exhaust gases to alter the angle of said vertical panel, thereby the flow of said exhaust gases into said spray nozzles is controlled by said vertical panel.

16. A wet gas processing apparatus according to claim 11, wherein a lower portion of at least one of said plurality of said vertical panels extending along said exhaust gas path to the region of said spray nozzles is free to swing so that said lower portion is virtually orthogonal to the direction in which said exhaust gases are flowing, thereby the cross-sectional area of the flow of said exhaust gases into said spray nozzles is controlled by said lower portion of said vertical panel.

17. A wet gas processing method in which liquid-vapor contact is effected when absorption liquid is entrained by exhaust gases driven from the bottom of an absorption tower to the top, and targeted components of said exhaust gases are absorbed by said absorption liquid, comprising:

a step of recirculating said absorption liquid fallen into a recovery vessel to a first liquid storage tank from which said absorption liquid is supplied to said absorption tower by way of a second liquid storage tank when the flow velocity of said exhaust gases falls below a given value.

18. A wet gas processing apparatus in which liquid-vapor contact is effected when absorption liquid is entrained by exhaust gases driven from the bottom of an absorption tower to the top, and targeted components of said exhaust gases are absorbed by said absorption liquid, comprising:

a first liquid storage tank to collect said absorption liquid for said liquid-vapor contact;

a recovery vessel on the bottom of said absorption tower;

a second liquid storage tank to collect said absorption liquid from said recovery vessel;

a recirculation pipe path which connects said recovery vessel on the bottom of said tower to said first liquid storage tank by way of said second liquid storage tank; and a control means to control the recirculation of said absorption liquid fallen into said recovery vessel to said first liquid storage tank from by way of said second liquid storage tank when the flow velocity of said exhaust gases falls below a given value.

19. A wet gas processing apparatus according to claim 18, further comprising:

a pressuring means to pressurize said first liquid storage tank for said absorption liquid; and a control means to control said pressuring means so as to keep the pressure of said absorption liquid supplied to said absorption tower most nearly constant.

20. A gas processing method of processing exhaust gas, in which an absorption tower is provided on a main circulation path which links a boiler, combustor or other source of exhaust gases to a smokestack or other means by which exhaust gases are exhausted to the atmosphere, and in said absorption tower, the flow velocity of said exhaust gases is used to entrain an absorption liquid to said exhaust gases for resulting liquid-vapor contact for causing targeted components of said exhaust gases to be absorbed by said absorption liquid, comprising;

a step of returning a processed exhaust gases exhausted from said absorption tower to an inlet of said absorption tower via a bypass when the flow velocity of said exhaust gases in said absorption tower falls below a given value.

21. A gas processing apparatus of processing exhaust gas, in which an absorption tower is provided on a main circulation path which links a boiler, or other source of exhaust gases to a smokestack or other means by which exhaust gases are exhausted to the atmosphere, and in said absorption tower, the flow velocity of said exhaust gases is used to entrain an absorption liquid to said exhaust gases for resulting liquid-vapor contact for causing targeted components of said exhaust gases to be absorbed by said absorption liquid, comprising;
- a bypass to return a processed exhaust gases exhausted from said absorption tower to an inlet of said absorption tower via a bypass; and
- a control means to control said processed exhaust gases exhausted from said absorption tower to said inlet of said absorption tower via said bypass when the flow velocity of said exhaust gases in said absorption tower falls below a given value.

22. A gas processing apparatus according to claim 21, further comprising:
- an adjusting means to adjust the dimensions of an exhaust gas path in said absorption tower when said flow velocity of said exhaust gases in said absorption tower falls below said given value.

23. A wet gas processing apparatus in which an absorption liquid which is collected in the bottom of an absorption tower is sprayed from a set of spray nozzles in said absorption tower, said sprayed absorption liquid is brought into contact with exhaust gases conducted into said absorption tower, targeted components in said exhaust gases are absorbed and removed from said absorption liquid, and said absorption liquid entrained to said exhaust gases in the form of mist is captured by a mist eliminator in the top of said absorption tower; comprising:
- a receptacle provided at the bottoms of said mist eliminator to receive said absorption liquid fell down from said mist eliminator; and
- a pipe extending from said bottoms of said mist eliminator to a given position in said absorption tower to release said absorption liquid from a lower opening of said pipe.

24. A wet gas processing apparatus according to claim 23, wherein said set of spray nozzles is upward-facing spray nozzles, and said lower opening of said pipe is provided in the higher space than a sprayed jet sprayed by said set of spray nozzles.

25. A wet gas processing apparatus according to claim 24, wherein said lower opening is formed into a spray nozzle.

26. A wet gas processing apparatus according to claim 23, wherein said lower opening of said pipe is placed in a recovery vessel.

* * * * *